US010983532B1

(12) United States Patent
Sarsilmaz et al.

(10) Patent No.: US 10,983,532 B1
(45) Date of Patent: Apr. 20, 2021

(54) DISTRIBUTED CONTROL OF HETEROGENEOUS MULTI-AGENT SYSTEMS

(71) Applicants: Selahattin Burak Sarsilmaz, Tampa, FL (US); Tansel Yucelen, Tampa, FL (US)

(72) Inventors: Selahattin Burak Sarsilmaz, Tampa, FL (US); Tansel Yucelen, Tampa, FL (US)

(73) Assignee: University of South Florida, Tampa, FL (US)

( * ) Notice: Subject to any disclaimer, the term of this patent is extended or adjusted under 35 U.S.C. 154(b) by 245 days.

(21) Appl. No.: 16/055,019

(22) Filed: Aug. 3, 2018

Related U.S. Application Data

(60) Provisional application No. 62/540,813, filed on Aug. 3, 2017.

(51) Int. Cl.
  *G05D 1/02* (2020.01)
  *G06F 17/16* (2006.01)

(52) U.S. Cl.
  CPC ......... *G05D 1/0295* (2013.01); *G05D 1/0214* (2013.01); *G05D 1/0276* (2013.01); *G06F 17/16* (2013.01)

(58) Field of Classification Search
  CPC .. G05D 1/0295; G05D 1/0214; G05D 1/0276; G06F 17/16
  See application file for complete search history.

(56) References Cited

U.S. PATENT DOCUMENTS

| 6,691,151 | B1 | 2/2004 | Cheyer et al. |
| 7,036,128 | B1 | 4/2006 | Julia et al. |
| 2007/0203693 | A1 | 8/2007 | Estes |
| 2017/0329348 | A1* | 11/2017 | Li ........................ G05D 1/0212 |

(Continued)

OTHER PUBLICATIONS

Yucelen et al., "Control of multivehicle systems in the presence of uncertain dynamics," International Journal of Control, 2013, 86(9):1540-1553 (Year: 2013).*

(Continued)

*Primary Examiner* — Bao Long T Nguyen
*Assistant Examiner* — Bakari Underwood
(74) *Attorney, Agent, or Firm* — Thomas|Horstemeyer, LLP

(57) ABSTRACT

Systems and methods for controlling motion of a vehicle in a group of vehicles. In one embodiment, the system includes a communication interface, a vehicle platform for travelling among the group of vehicles, and an electronic processor. The electronic processor is configured to determine a local virtual tracking error signal and a controller state signal. The electronic processor is also configured to determine a self-navigation input control signal based on the local virtual tracking error signal and the controller state signal. The self-navigation input control signal is for navigating the vehicle platform. A trajectory of an exosystem is based on a boundedness condition. The vehicle communicates with other vehicles in the group of vehicles via a fixed augmented directed connected communication graph topology. Each vehicle in the group of vehicles is stabilizable and satisfies a transmission zero condition. Design matrices of the vehicle satisfy an internal model principle.

13 Claims, 7 Drawing Sheets

(56) References Cited

U.S. PATENT DOCUMENTS

2018/0101169 A1* 4/2018 Applewhite ............ B64C 11/28

OTHER PUBLICATIONS

Adib Yaghmaie et al., "Output regulation of heterogeneous linear multi-agent systems with differential graphical game," International Journal of Robust and Nonlinear Control, 2016, 26:2256-2278.

Adib Yaghmaie et al., "Output regulation of linear heterogeneous multi-agent systems via output and state feedback," Automatica, 2016, 67:157-164.

Cai et al., "The adaptive distributed observer approach to the cooperative output regulation of linear multi-agent systems," Automatica, 2017, 75:299-305.

Cao et al., "Leader-follower consensus of linear multi-agent systems with unknown external disturbances," Systems & Control Letters, 2015, 82:64-70.

Fiedler et al., "On matrices with non-positive off-diagonal elements and positive principal minors," Czechoslovak Mathematical Journal, 1962, 12(3):382-400.

Francis et al., "The internal model principle of control theory," Automatica, 1976, 12(5).

Huang et al., "Cooperative output regulation of heterogeneous multi-agent systems: an H∞ criterion," IEEE Transactions on Automatic Control, 2014, 59(1):267-273.

Huang et al., "On a robust nonlinear servomechanism problem," IEEE Transactions on Automatic Control, 1994, 39(7):1510-1513.

Kofman, "Non conservative ultimate bound estimation in LTI perturbed systems," Automatica, 2005, 41:1835-1838.

Kottenstette et al., "On relationships among passivity, positive realness, and dissipativity in linear systems," Automatica, 2014, 50(4): 18 pages.

Li et al., "Distributed robust consensus control of multi-agent systems with heterogeneous matching uncertainties," Automatica, 2014, 50(3): 883-889.

Li et al., "Distributed tracking control for linear multiagent systems with a leader of bounded unknown input," IEEE Transactions on Automatic Control, 2013, 58(2):518-523.

Li et al., "Synchronised output regulation of leader-following heterogeneous networked systems via error feedback," International Journal of Systems Science, 2016, 47(4): 755-764.

Modares et al., "Optimal model-free output synchronization of heterogeneous systems using off-policy reinforcement learning," Automatica, 2016, 71:334-341.

Moylan et al., "On the stability and well-posedness of interconnected nonlinear dynamical systems," IEEE Transactions on Circuits and Systems, 1980, 27(11):1097-1101.

Olfati-Saber et al., "Consensus and cooperation in networked multi-agent systems," Proceedings of the IEEE, 2007, 95(1):215-233.

Peng et al., "Cooperative tracking and estimation of linear multi-agent systems with a dynamic leader via iterative learning," International Journal of Control, 2014, 87(6): 1163-1171.

Sarsilmaz et al., "On control of heterogeneous multiagent systems with unknown leader dynamics," ASME Dynamic Systems and Control Conference, 2017.

Sarsilmaz et al., "On control of heterogeneous multiagent systems: A dynamic measurement output feedback approach," in American Control Conference, 2018, 6 pages.

Shivakumar et al., "A sufficient condition for nonvanishing of determinants," Proceedings of the American Mathematical Society, 1974, 43(1):63-66.

Sontag, "Input to state stability: Basic concepts and results," Nonlinear and Optimal Control Theory, 2006, pp. 163-220.

Sontag, "The ISS philosophy as a unifying framework for stability-like behavior," Nonlinear Control in the Year 2000, 2000, pp. 443-468.

Su et al., "Cooperative output regulation of linear multi-agent systems by output feedback," Systems & Control Letters, 2012, 61(12):1248-1253.

Su et al., "Cooperative output regulation of linear multiagent systems," IEEE Transactions on Automatic Control, 2012, 57(4): 1062-1066.

Tang, "Leader-following coordination problem with an uncertain leader in a multi-agent system," IET Control Theory and Applications, 2014, 8(10): 773-781.

Tran et al., "On control of multiagent formations through local interactions," in IEEE Conference on Decision and Control, 2016.

Wang et al., "A Distributed Control Approach to a Robust Output Regulation Problem for Multi-Agent Linear Systems," IEEE Transactions on Automatic Control, 2010, 55(12): 2891-2895.

Wieland et al., "An internal model principle is necessary and sufficient for linear output synchronization," Automatica, 2011, 47(5): 1068-1074.

Willems, "The generation of Lyapunov functions for input-output stable systems," SIAM Journal on Control, 1971, 9(1):105-134.

Yucelen et al., "Control of multivehicle systems in the presence of uncertain dynamics," International Journal of Control, 2013, 86(9):1540-1553.

\* cited by examiner

DISTRIBUTED CONTROL OF HETEROGENEOUS MULTI-AGENT SYSTEMS

CROSS-REFERENCE TO RELATED APPLICATIONS

This application is a non-provisional of and claims benefit of U.S. Provisional Application No. 62/540,813, filed on Aug. 3, 2017, the entire contents of which are incorporated herein by reference.

STATEMENT REGARDING FEDERALLY SPONSORED RESEARCH OR DEVELOPMENT

This invention was made with government support CMMI1657637 awarded by the National Science Foundation. The Government has certain rights in the invention

BACKGROUND OF THE INVENTION

Heterogeneous multi-agent systems formed by networks of agents having different dynamics and dimensions present a significantly broader class of multiagent systems than their heterogeneous and homogeneous counterparts that consist of networks of agents having different dynamics with the same dimension and identical dynamics, respectively. Therefore, the distributed control of this class of multiagent systems has been an attractive research topic in the systems and control field.

In particular, the cooperative output regulation problem of heterogeneous (in dynamics and dimension) linear time-invariant multiagent systems, where the output of all agents synchronize to the output of the leader, over general fixed directed communication graph topologies have been recently investigated. This problem can be regarded as the generalization of the linear output regulation problem to multi-agent systems. Therefore, distributed control approaches to this problem can be classified into two types: feedforward design methodology and internal model principle. With the former methodology, the feedforward gain of each agent relies on the solution of the regulator equations; hence, this methodology is known to be not robust to plant uncertainties. On the other hand, the latter methodology is robust with respect to small variations of the plant parameters. However, it cannot be applied when the transmission zero condition does not hold.

The common denominator of these results is that an exosystem, which has an unforced linear time-invariant dynamics, generates both a reference trajectory and external disturbances to be tracked and rejected by networks of agents. Specifically, the system matrix of the exosystem is explicitly used by controllers of all agents in some systems and a proper subset of agents in other systems; or each agent incorporates a p-copy internal model of this matrix in its controller. In practical applications, however, it can be a challenge to precisely know the system matrix of the exosystem, even the dynamical structure of the exosystem; especially, when an external leader interacts with the network of agents or a control designer simply injects optimized trajectory commands to the network based on, for example, an online path planning algorithm. To allow ultimately bounded tracking error in such cases, an alternative, generalized definition is needed for the cooperative output regulation problem.

SUMMARY OF THE INVENTION

In this disclosure, the cooperative output regulation problem of heterogeneous (in dynamics and dimension) linear time-invariant multiagent systems over general fixed directed communication graph topologies is considered. A new definition of the linear cooperative output regulation problem that is more suitable for practical applications is presented. For internal model based distributed dynamic state feedback, output feedback with local measurement, and output feedback control laws, the solvability of this problem by first assuming a global condition is investigated and then a local sufficient condition under standard assumptions is provided.

The approach of this disclosure is relevant to previous works in which the linear cooperative output regulation problem with an internal model based distributed dynamic state feedback control law are studied. In particular, some previous systems use an output feedback control under an output feedback stabilizability condition. In addition to the generalized definition of the linear cooperative output regulation problem, this disclosure differs from previous approaches at least in terms of the following points.

This disclosure considers not only dynamic state feedback but also dynamic output feedback with local measurement and dynamic output feedback, where the output feedback stabilizability is not assumed.

To prove the existence of a unique solution to the matrix equations that is important for the solvability of the problem, previous approaches decomposes the matrix equations, which include the overall dynamics of the multi-agent system, into matrix equations, which deal with the dynamics of each agent separately. In contrast, Lemma 3B described herein, which is also applicable to dynamic output feedback cases, guarantees that these matrix equations have a unique solution without the need to decompose them.

In addition, a few gaps in the related results of previous approaches are illustrated and fixed.

The disclosure provides a system for controlling motion of a vehicle in a group of vehicles. In one embodiments, the system includes a communication interface, a vehicle platform for travelling among the group of vehicles, and an electronic processor. The electronic processor is configured to determine a local virtual tracking error signal and a controller state signal. The electronic processor is also configured to determine a self-navigation input control signal based on the local virtual tracking error signal and the controller state signal. The self-navigation input control signal is for navigating the vehicle platform when travelling as a member of the group of vehicles. A trajectory of an exosystem is based on a boundedness condition. The trajectory of the exosystem includes external disturbances and a trajectory of a leader vehicle of the group of vehicles. The vehicle communicates with other vehicles in the group of vehicles via a fixed augmented directed connected communication graph topology. Each vehicle in the group of vehicles is stabilizable. Each vehicle in the group of vehicles satisfies a transmission zero condition. Design matrices of the vehicle satisfy an internal model principle.

The disclosure also provides a method for controlling motion of a vehicle in a group of vehicles. In one embodiment, the method includes determining, with an electronic processor of the vehicle, a local virtual tracking error signal and a controller state signal. The method also includes determining, with the electronic processor, a self-navigation input control signal based on the local virtual tracking error signal and the controller state signal. The self-navigation input control signal is for navigating a vehicle platform of the vehicle when travelling as a member of the group of vehicles. A trajectory of an exosystem is based on a boundedness condition. The trajectory of the exosystem includes external disturbances and a trajectory of a leader vehicle of the group of vehicles. The vehicle communicates with other vehicles in the group of vehicles via a fixed augmented directed connected communication graph topology. Each vehicle in the group of vehicles is stabilizable. Each vehicle in the group of vehicles satisfies a transmission zero condition. Design matrices of the vehicle satisfy an internal model principle.

Other aspects of the invention will become apparent by consideration of the detailed description and accompanying drawings.

DETAILED DESCRIPTION

Figure 1:
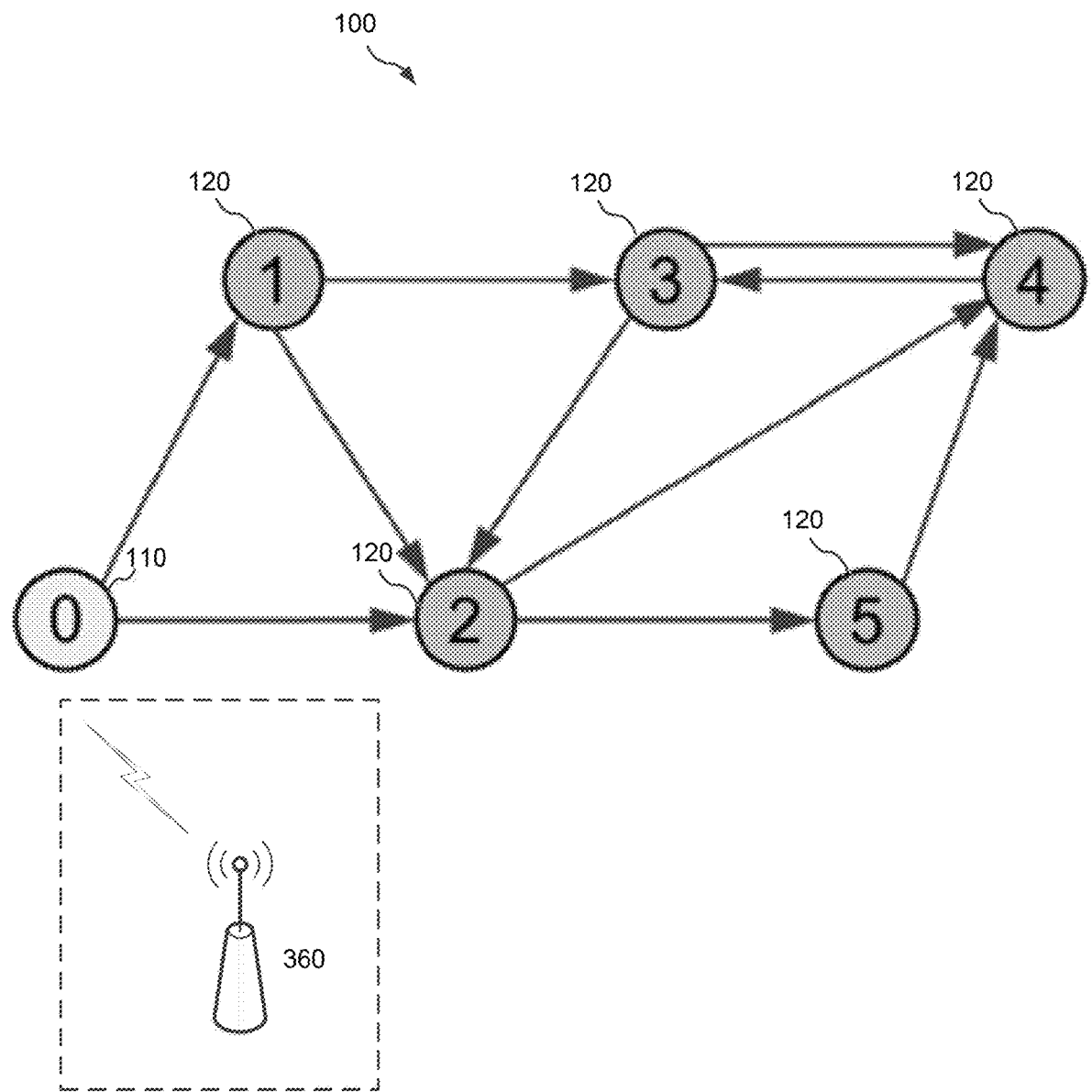
FIG. 1 is an augmented directed graph of a multi-agent system, in accordance with some embodiments.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways.

In what follows of this document, two embodiments are presented. The first embodiment should be regarded as an early preliminary result performed by the inventors, where the second embodiment captures the first embodiment as a special case and in a more mathematically-elegant fashion.

First Embodiment

A standard notation is used in the first embodiment. Specifically, R denotes the set of real numbers, $\mathbb{C}$ denotes the set of complex numbers, $R^n$ denotes the set of n×1 real column vectors, $R^n$ denotes the set of n×m real matrices, $I_n$ denotes the n×n identity matrix, $1_n$ denotes the n×1 vector of all ones, and $\triangleq$ denotes equality by definition. In addition, $(\bullet)^T$ for transpose, $(\bullet)^{-1}$ for inverse, $\det(\bullet)$ for determinant ker$(\bullet)$ for kernel, $\rho(\bullet)$ for spectral radius, $\|\bullet\|$ for any norm in $R^n$, $|\bullet|_2$ for the Euclidean norm, diag$(\bullet)$ for block diagonal operator, and $\otimes$ for the Kronecker product. Furthermore, the following notation from [33] is adopted. If a, b∈$R^n$, then the statement "a≤b" is equivalent to "$a_k \leq b_k$" for all k=1, ..., n. If "a≤b" and T∈$R^{n \times n}$ is a nonnegative matrix (i.e., all elements of T are nonnegative), than Ta≤Tb. Finally, the space $\mathcal{L}_p$ for 1≤p<∞ is defined as the set of all piecewise continuous functions u: [0 ∞)→$R^m$ such that $\|u(t)\|\mathcal{L}_p = (\int_0^\infty \|u(t)\|^p dt)^{1/p} < \infty$ and extended space $\mathcal{L}_{pe}$ is defined using $u_\tau$ (i.e., truncated u) instead of u [9].

Next, the graph theoretical notation used in the first embodiment, which is based on [15]. In particular, consider a time-invariant directed graph $\mathcal{G} = (V, E)$, where V= $\{v_1, \ldots, v_N\}$ is a nonempty finite set of N nodes and E⊂V×V is a set of edges. Each node in V corresponds to a follower agent in the network. There is an edge rooted at node $v_j$ and ended at $v_i$, i.e. $(v_j, v_i) \in E$ if and only if $v_i$ receives information from $v_j$. $A=[a_{ij}] \in R^{N \times N}$ denotes the adjacency matrix which describes the graph structure, that is $a_{ij} = 1 \Leftrightarrow (v_j, v_i) \in E$ and $a_{ij}=0$ otherwise. Repeated edges and self loops are not allowed, that is $a_{ii}=0$, $\forall i \in \mathcal{N}$ with $\mathcal{N} = \{1, \ldots, N\}$. The set of neighbors of node $v_i$ is denoted as $N_i = \{j | (v_j, v_i) \in E\}$. In-degree and Laplacian matrices are defined as D=diag $(d_1, \ldots, d_N)$ with $$d_i = \sum_{j \in N_i} a_{ij}$$

and L=D−A, respectively. Thus L has zero row sums (i.e., $L1_N = 0$). A directed path from node $v_i$ to node $v_j$ is a sequence of successive edges in the form of $\{(v_i, v_p), (v_p, v_q), \ldots, (v_r, v_j)\}$. A directed graph is said to have a spanning tree if there is a root node such that it has directed paths to all other nodes in the graph. Augmented time-invariant directed graph is defined as $\bar{\mathcal{G}} = (\bar{V}, \bar{E})$, where $\bar{V} = \{v_0, v_1, \ldots, v_N\}$ is the set of N+1 nodes, including the leader node and all follower nodes, and $\bar{E} \subset \bar{V} \times \bar{V}$ is the set of edges such that $E \subset \bar{E}$.

Problem Formulation. Consider a system of N follower agents with heterogeneous linear time-invariant dynamics, subject to external disturbances, exchanging information amount each other using their local measurement according to a fixed and directed communication graph topology $\mathcal{G}$. For example, the dynamics of follower agent $i \in \mathcal{N}$ can be given by $$\dot{x}_i(t) = A_i x_i(t) + B_i u_i(t) + \delta_i(t), \quad x_i(0) = x_{i0}, \quad t \geq 0, \quad (101)$$

$$y_i(t) = C_i x_i(t), \quad (102)$$

with state $x_i(t) \in \mathbb{R}^{n_i}$, input $u_i(t) \in \mathbb{R}^{n_i}$, unknown external disturbance $\delta_i(t) \in \mathbb{R}^{n_i}$, and output $y_i(t) \in \mathbb{R}^l$. In addition, consider a leader node with unknown dynamics, where the output of this leader, $y_0(t) \in \mathbb{R}^l$, is available to a nonempty proper subset of follower agents.

In contrast to unforced linear time-invariant exosystems that are studied in the literature (e.g., see [7,30]), the leader node is a command generator for the set of follower agents with dynamics given by (101) and (102). From this perspective, the dynamics of the leader node can have any (for example, linear or nonlinear) dynamics with any dimension provided that it has a unique solution and it can even be a static system. Similarly, external disturbances cannot be generated by known unforced linear time-invariant exosystem.

To state the objective considered here, the follow equation is defined $$e_i(t) \triangleq y_i(t) - y_0(t), \quad (103)$$

as the output tracking error between the output of each follower agent and the output of the leader. In particular, considering the heterogeneous multiagent system, subject to unknown external disturbances, given by equations (101) and (102) together with the output of the leader $y_0(t)$ having unknown dynamics, the objective is to establish a distributed control architecture $u_i(t)$ for all agents i in $\mathcal{G}$ such that the output tracking error given by equation (103) becomes uniformly ultimately bounded. If, in addition, the external disturbances and the output of the leader are constant or they converge to constant vectors, then the output of each follower agent asymptotically converges to the output of the leader $y_0(t)$ (i.e., asymptotic synchronization). This invention makes the following assumptions to achieve this objective.

ASSUMPTION 1A. There exist $\alpha_i \geq 0$ and $\beta \geq 0$ such that $$\|\delta_i(t)\|_2 \leq \alpha_i < \infty, \forall t \geq 0, \forall i \in \mathcal{N}, \quad (104)$$

$$\|\dot{y}_0(t)\|_2 \leq \beta < \infty, \forall t \geq 0. \quad (105)$$

ASSUMPTION 2A. The augmented graph $\mathcal{G}$ has a spanning tree with the root node being the leader node.

ASSUMPTION 3A. There exist $K_{1i}$ and $K_{2i}$ such that $A_{mi}$ and $C_i A_{mi}^{-1} B_{mi}$ are nonsingular for all $i \in \mathcal{N}$, where $A_{mi} \triangleq A_i - B_i K_{1i} \in \mathbb{R}^{n_i \times n_i}$ and $B_{mi} \triangleq -B_i K_{2i} \in \mathbb{R}^{n_i \times l}$.

ASSUMPTION 4A. The pair $(A_i, B_i)$ is stabilizable for all $i \in \mathcal{N}$.

ASSUMPTION 5A. Each follower agent satisfies rank $$\begin{bmatrix} A_i & B_i \\ C_i & 0 \end{bmatrix} = n_i + l. \quad (106)$$

Note that Assumption 1A is standard and it even allows the external disturbances and the leader to have unbounded signals provided that their derivatives are bounded. Furthermore, from Remark 3.2 in [15], Assumption 2A can be a necessary condition for the cooperative tracking problem considered in this disclosure. It should also be noted that Assumption 3A shows uniform ultimate boundedness of the output tracking error given by equation (103). Specifically, by applying Lemma 2.5.2 in [1], necessary conditions for Assumption 3A are stated as $1 \leq n_i$, $1 \leq m_i$, rank $(C_i) = l$ (i.e., $C_i$ is full row rank), rank $(K_{2i}) = l$ (i.e., $K_{2i}$ is full column rank), and rank $(B_i) \geq l$. In the proposed approach B, Assumptions 1A, 2A, and 3A and a global sufficient condition are used to achieve the objective stated above. In addition, Assumptions 4A and 5A are further utilized to achieve the same objective, but with an agent-wise local sufficient condition.

Distributed Control Architecture. Based on the stated objective and assumptions in the foregoing discussions, the proposed distributed control architecture is presented. For this purpose, first recall that the leader node is observed from a nonempty proper subset of nodes in graph $\mathcal{G}$. If all follower agents observe the leader, independent controller can be designed for each follower even though the controller architecture proposed herein it still applicable. In particular, if node $v_i$ observes the leader node $v_0$, then there exists an edge $(v_0, v_i)$ with weighting gain $k_i > 0$. Next, each node i in $\mathcal{G}$ has access to its own state $x_i(t)$ and relative output error, that is, $(y_i(t) - y_j(t))$ for all $j \in \mathcal{N}_i$. Similar to [30], the local virtual output tracking error can be defined as $$e_{vi}(t) \triangleq \frac{1}{d_i + k_i} \left[ \sum_{j \in N_i} a_{ij}(y_i(t) - y_j(t)) + k_i(y_i(t) - y_0(t)) \right]. \quad (107)$$

Departing from results in [30,7], an auxiliary dynamics (compensator) with a pair $G_{1i}$, $G_{2i}$ is defined that incorporates an l-copy internal model of the exosystem, which has unforced linear time-invariant dynamics. This is due to the fact that the leader dynamics is assumed to be unknown and the external disturbances are not due to the exosystem in this invention. Instead, the following auxiliary dynamics are utilized which represents the integration of the local virtual output tracking error, to address the stated objective in the previous section $$\dot{z}_i(t) = e_{vi}(t), z_i(0) = z_{i0}, t \geq 0. \quad (108)$$

Note that equation (108) can be viewed to have the pair $(0, I_l)$ incorporating an l-copy internal model, but it does not necessarily match with the dynamics of the leader and the spectral properties of the external disturbances unless the output of the leader and the external disturbances are generated by an unforced linear time-invariant exosystem yielding constant output and disturbances. Building on the above definitions, the local cooperative controller considered in this invention has the form $$u_i(t) = -K_1 x_i(t) - K_2 z_i(t). \quad (109)$$

The Proposed Approach: B): Global and Local Sufficient Stability Conditions. Considering the objective, assumptions, and the proposed distributed control architecture in previous sections, a global sufficient condition is established for the uniform ultimate boundedness of the output tracking error, where it is shown the conditions when this result reduces to asymptotic synchronization. Based on a converse theorem for linear time-invariant systems, we then derive an agent-wise local sufficient condition by utilizing a small gain theorem and stabilizability and detectability of global multiagent system dynamics, which is shown that both of them are independent of graph topology except one necessary condition for cooperative tracking problem.

Global Sufficient Stability Condition. In order to express the closed-loop dynamics of follower agents in a compact form, let $x(t) \triangleq [x_1^T(t), \ldots, x_N^T(t)]^T \in \mathbb{R}^{\bar{n}}$, $\delta(t) \triangleq [\delta_1^T(t), \ldots, \delta_N^T(t)]^T \in \mathbb{R}^{\bar{n}}$, where $\bar{n} = \sum_{i=1}^N n_i$, $z(t) \triangleq [z_1^T(t), \ldots, z_N^T(t)]^T \in \mathbb{R}^{Nl}$, $A_m \triangleq \text{diag}(A_{m1}, \ldots, A_{mN})$, and $B_m \triangleq \text{diag}(B_{m1}, \ldots, B_{mN})$. From equations (101) and (109), it is given $$\dot{x}(t) = A_m x(t) + B_m z(t) + \delta(t), x(0) = x_0, t \geq 0. \quad (110)$$

Local virtual output tracking error given by equation (107) can also be equivalently written as $$e_{vi}(t) = \frac{1}{d_i + k_i} \left[ (d_i + k_i) y_i(t) - \sum_{j \in N_i} a_{ij} y_j(t) - k_i y_0(t) \right] \quad (111)$$

Now, using equation (102), equation (111) can be further rewritten as $$e_{vi}(t) = C_i x_i(t) - \frac{1}{d_i + k_i} \left[ \sum_{j \in N_i} a_{ij} y_j(t) - k_i y_0(t) \right] \quad (112)$$

To express the auxiliary dynamics of all followers in a compact form, let $$y_{0a}(t) \triangleq 1_N \otimes y_0(t), \in \mathbb{R}^{Nl}, K \triangleq \text{diag}(k_1, \ldots, k_N),$$

$$F \triangleq \text{diag}\left(\frac{1}{d_1 + k_1}, \ldots, \frac{1}{d_N + k_N}\right),$$

and $C \triangleq \text{diag}(C_1, \ldots, C_N)$ (F is finite matrix here by Assumption 2A). From equations (102), (108), and (112), it is given $$\dot{z}(t) = [(I_N - FA) \otimes I_l] Cx(t) - (FK \otimes 1_l) y_{0a}(t),$$

$$z(0) = z_0, \quad t > 0. \tag{113}$$

By letting $y(t) \triangleq [y_1^T(t), \ldots, y_N^T(t)]^T \in \mathbb{R}^{Nl}$, the output equation of all follower agents is given by $$y(t) = Cx(t). \tag{114}$$

Finally, let $\eta(t) \triangleq [x^T(t) z^T(t)]^T$, $\omega(t) \triangleq [\delta^T(t), y_{0a}^T(t)]^T$, $$A_g \triangleq \begin{bmatrix} A_m & B_m \\ [(I_N - FA) \otimes I_l]C & 0 \end{bmatrix}, \quad B_g \triangleq \begin{bmatrix} I_n & 0 \\ 0 & -FK \otimes I_l \end{bmatrix}$$

and $C_g \triangleq [C, 0]$. Using equations (110), (113), and (114), the closed-loop dynamics of follower agents together with their auxiliary dynamics can be compactly represented as $$\dot{\eta}(t) = A_g \eta(t) + B_g \omega(t), \quad \eta(0) = \eta_0, \quad t \geq 0, \tag{115}$$

$$y(t) = C_g \eta(t). \tag{116}$$

In order to state Theorem 1A, which provides the global sufficient condition for uniformly ultimately bounded output tracking error, we require two lemmas. The first lemma shows that $C_g A_g^{-1} [I_{\tilde{n}}, 0]^T = 0$ and $y_{0a}(t)$ is inherently in the kernel of $C_g A_g^{-1} [0, -FK \otimes I_l]^T + I_{Nl}$. The second lemma provides an inequality to upper bound the output tracking error.

LEMMA 1A. If Assumptions 2A and 3A hold, then $$-C_g A_g^{-1} B_g \omega(t) = y_{0a}(t). \tag{117}$$

Proof. Starting by proving that $A_g$ is nonsingular. From Proposition 2.8.7 in [1], it is known that $A_m$ and $-[(I_N - FA) \otimes I_l] CA_m^{-1} B_m$ are nonsingular, then $A_g$ is nonsingular. Based on Assumption 3A, it can be observed that the first sufficient condition, $A_m$ being nonsingular, is satisfied. Further, $-[(I_N - FA) \otimes I_l] CA_m^{-1} B_m$ is nonsingular. For this purpose, first note that $A_m^{-1} = \text{diag}(A_{m1}^{-1}, \ldots, A_{mN}^{-1})$ by at least Assumption 3A and Lemma 2.8.2 in [1]. Then, $CA_m^{-1} B_m = \text{diag}(C_1 A_{m1}^{-1} B_{m1}, \ldots, C_N A_{mN}^{-1} B_{mN})$, and hence, $C_{Am}^{-1} B_m$ is nonsingular by Assumption 3A. Furthermore, the theorem in [25] is applicable here because of Assumption 2A. This theorem implies that $I_N - FA$ is nonsingular, and hence, $(I_N - FA) \otimes I_l$ is nonsingular by Proposition 7.1.7 in [1]. Since $CA_m^{-1} B_m$ and $(I_N - FA) \otimes I_l$ are nonsingular matrices, the second sufficient condition, $-[(I_N - FA) \otimes I_l] CA_m^{-1} B_m$ is nonsingular, is satisfied. Thus, $A_g$ is nonsingular.

Next, let $$A_g^{-1} \triangleq \begin{bmatrix} M_1 & M_2 \\ M_3 & M_4 \end{bmatrix}.$$

Using the definition of $A_g^{-1}$, $B_g$, $C_g$, and $\omega(t)$, the following equation is obtained $$-C_g A_g^{-1} B_g(t) = -CM_1 \delta(t) + CM_2 (FK \otimes I_l) y_{0a}(t). \tag{118}$$

From Proposition 2.8.7 in [1], $$M_1 = A_m^{-1} + A_m^{-1} B_m (-[(I_N - FA) \otimes I_l] CA_m^{-1} B_m)^{-1}$$

$$\times [(I_N - FA) \otimes I_l] CA_m^{-1}$$

$$= A_m^{-1} - A_m^{-1} B_m (CA_m^{-1} B_m)^{-1}$$

$$\times [(I_N - FA) \otimes I_l]^{-1} [(I_N - FA) \otimes I_l] CA_m^{-1}$$

$$= A_m^{-1} - A_m^{-1} B_m (CA_m^{-1} B_m)^{-1} CA_m^{-1} \tag{119}$$

$$M_2 = -A_m^{-1} B_m (-[(I_N - FA) \otimes I_l] CA_m^{-1} B_m)^{-1},$$

$$= A_m^{-1} B_m (CA_m^{-1} B_m)^{-1} [(I_N - FA)^{-1} \otimes I_l]. \tag{120}$$

Now, inserting $M_1$ and $M_2$ into equation (118), the following equation is obtained $$-C_g A_g^{-1} B_g \omega(t) = [(I_N - FA)^{-1} \otimes I_l](FK \otimes I_l) y_{0a}(t),$$

$$= [(I_N - FA)^{-1} FK \otimes I_l](1_N \otimes y_0(t))$$

$$= (I_N - FA)^{-1} FK 1_N \otimes y_0(t). \tag{121}$$

Note that F is nonsingular by Assumption 2A and $F^{-1} = D + K$, t then $F^{-1}(I_N - FA)1_N = (D + K - A)1_N = (L + K)1_N = K1_N$. Thus, $(I_N - FA)^{-1} FK 1_N = 1_N$ (i.e., each row of $(I_N - FA)^{-1} FK$ has a sum equal to 1). Using the foregoing property, the equality given in equation (117) from equation (121) is obtained.

LEMMA 2A. If Assumptions 2A and 3A hold, then $$\|e_i(t)\|_2 \leq \|C_g\|_2 \|\zeta(t)\|_2, \quad \forall i \in \mathcal{N}, \tag{122}$$

where $\zeta(t) \triangleq \eta(t) + A_g^{-1} B_g \omega(t)$ is the assistant state.

Proof. From the proof of Lemma 1, it is known that $A_g$ is nonsingular under Assumptions 2A and 3A. Using equation (116) and the assistant state $\zeta(t)$, the following is obtained $$y(t) = C_g(\zeta(t) - A_g^{-1} B_g \omega(t)). \tag{123}$$

Now, from Lemma 1A, equation (123) can be rewritten as $$y(t) = C_g \zeta(t) + y_{0a}(t). \tag{124}$$

Using the fact that $\|e_i(t)\|_2 \leq \|y(t) - y_{0a}(t)\|_2$, $\forall i \in \mathcal{N}$, we have $$\|e_i(t)\|_2 \leq \|C_g \zeta(t)\|_2, \quad \forall i \in \mathcal{N} \tag{125}$$

Then, equation (122) immediately follows from equation (125).

THEOREM 1A. Consider the heterogeneous multiagent system given by equations (101) and (102) together with the output of the leader $y_0(t)$. In addition, consider the local cooperative controller given by equation (109) along with equations (107) and (108). Let Assumptions 1A, 2A, and 3A hold. If $A_g$ is Hurwitz, then $$\|e_i(t)\|_2 \leq \max\{\bar{c} e^{-\lambda t} \|\zeta_0\|_2, b\}, \quad \forall t \geq 0, \forall i \in \mathcal{N}, \tag{126}$$

where $\zeta_0 = \zeta(0)$, $\bar{c} = 2c \|C_g\|_2$, and $$b = \frac{\bar{c} \|A_g^{-1} B_b\|_2 \sqrt{N \beta^2 + a^2}}{\lambda},$$

with c and $\lambda$ are being positive constants that satisfy $\|e^{A_g t}\|_2 \leq c e^{-\lambda t}$ and $a^2 = \sum_{i=1}^{N} a_i^2$.

Proof. The time derivative of $\zeta(t)$ can be expressed as $$\dot{\zeta}(t) = \dot{\eta}(t) + A_g^{-1} B_g \dot{\omega}(t). \tag{127}$$

Inserting equation (115) into equation (127) and using $\eta(t) = \zeta(t) - A_g^{-1} B_g \omega(t)$, equation (127) can be rewritten as $$\dot{\zeta}(t) = A_g \zeta(t) + A_g^{-1} B_g \dot{\omega}(t), \quad \zeta(0) = \zeta_0, \quad t \geq 0. \tag{128}$$

Then, the solution of (128) can be written as $$\zeta(t) = e^{A_g t} \zeta_0 + \int_0^t e^{A_g(t-\tau)} A_g^{-1} B_g \dot{\omega}(\tau) d\tau. \tag{129}$$

Since $A_g$ is Hurwitz, there exist positive constants c and $\lambda$ such that $\|e^{A_g t}\|_2 \leq c e^{-\lambda t}$. Furthermore, let the eigenvalues of $A_g$ be labeled in a nondecreasing order, that is, $\text{Re}(\lambda_1) \leq \text{Re}(\lambda_2) \leq \ldots \leq \text{Re}(\lambda_{\tilde{n}+Nl})$. For example, $\lambda < -\text{Re}(\lambda_{\tilde{n}+Nl})$ from Section 8.3 in [6]. Using the bound on the state transition matrix, $$\|\zeta(t)\|_2 \leq c e^{-\lambda t} \|\zeta_0\|_2 + \int_0^t c e^{-\lambda(t-\tau)} \|A_g^{-1} B_g\|_2 \|\dot{\omega}(\tau)\|_2 d\tau. \tag{130}$$

Note that $\|\dot{\omega}(t)\|_2^2 = \|\dot{y}_{0a}(t)\|_2^2 + \|\dot{\delta}(t)\|_2^2$. Moreover, $\dot{y}_{0a}(t) = 1_N \otimes \dot{y}_0(t)$, and hence, $\|\dot{y}_{0a}(t)\|_2^2 = N\|\dot{y}_0(t)\|_2^2$ and $\|\dot{\delta}(t)\|_2^2 = \sum_{i=1}^{N} \|\dot{\delta}_i(t)\|_2^2$. Based on Assumption 1A, $\|\dot{w}(t)\|_2 \leq \sqrt{N\beta^2 + \alpha^2}$ for all $t \geq 0$. Thus, the upper bound of the assistant state is given by $$\|\zeta(t)\|_2 \leq ce^{-\lambda t}\|\zeta_0\|_2 + \frac{c\|A_g^{-1}B_g\|_2}{\lambda}\sqrt{N\beta^2 + a^2}, \forall t \geq 0. \quad (131)$$

From equation (131) and Lemma 2A, $$\|e_i(t)\|_2 \leq ce^{-\lambda t}\|C_g\|_2\|\zeta_0\|_2 + \frac{c\|C_g\|_2\|A_g^{-1}B_g\|_2}{\lambda}\sqrt{N\beta^2 + a^2}, \quad (132)$$
$$\forall t \geq 0, \forall i \in \mathcal{N}.$$

Now, it follows from equation (132) and the fact that $a_1(t) + a_2 \leq \max\{2a_1(t), 2a_2\}$, $\forall t \geq 0$, which holds for any $a_1(t) \geq 0$ and $a_2 \geq 0$, (26) holds.

The following corollary is now immediate.

COROLLARY 1A. If the external disturbance of a follower agent is time-varying (i.e., $\exists i \in N$ such that $a_i > 0$) or the leader has time-varying output (i.e., $\beta > 0$), equation (126) implies that there exists $T \geq 0$ such that $$\|e_i(t)\|_2 \leq \bar{c}e^{-\lambda t}\|\zeta_0\|_2, \forall T \geq t \geq 0, \forall i \in \mathcal{N}, \quad (133)$$

$$\|e_i(t)\|_2 \leq b, \forall t \geq T, \forall i \in \mathcal{N}. \quad (134)$$

Proof By Assumption 3A, it is possible that $\|C_i\|_2 \neq 0$ for all $i \in \mathcal{N}$, and hence, $\|C_g\|_2 > 0$. Furthermore, rank $(B_g) \geq \bar{n}+1$ by Assumption 2A. Recall that $A_g$ is nonsingular, then rank $(A_g) = \text{rank}(A_g^{-1}) = \bar{n} + Nl$. From Sylvester's inequality, rank $(A_g^{-1}B_g) \geq \bar{n}+1$, and hence, $\|A_g^{-1}B_g\|_2 > 0$. Finally, since c and $\lambda$ are positive constants, it follows that $b > 0$ as $\beta > 0$ or $a > 0$.

From equation (126), either $\bar{c}\|\zeta_0\|_2 > b$ or $\bar{c}\|\zeta_0\|_2 \leq b$ at $t=0$ is obtained. In the former case, owing to the continuity of $e^{-\lambda t}$, there is $T > 0$ such that $\bar{c}e^{-\lambda t}\|\zeta_0\|_2 = b$. Then, it can be readily shown that $$T = \lambda^{-1}\ln\left(\frac{\|\zeta_0\|_2\lambda}{\|A_g^{-1}B_g\|_2\sqrt{N\beta^2 + a^2}}\right) > 0.$$

Thus, equations (133) and (134) are satisfied. In the latter case, equations (133) and (134) are satisfied with $T=0$ trivially.

REMARK 1A. Theorem 1A shows that the ultimate bound b of the output tracking error of each follower agent is associated with the bound on the time derivative of $\delta(t)$ and $y_0(t)$ (i.e., $\alpha$ and $\beta$). For example, as $\alpha$ and $\beta$ decrease (respectively, increase), b decreases (respectively, increases). If, in addition, each follower agent is subject to constant external disturbance and the leader has constant output (i.e., $\alpha=0$ and $\beta=0$), it is clear from (26) that $b=0$, and hence, the output tracking error of each follower agent goes to zero asymptotically (i.e., $\lim_{t \to \infty} e_i(t) = 0$, $\forall i \in \mathcal{N}$).

REMARK 2A. Since the solution of linear time-invariant systems are known, we use this advantage in the stability analysis conducted in Theorem 1A and Corollary 1A. On the other hand, for uniform ultimate boundedness, one can also apply Lyapunov-like theorems such as Theorem 4.18 in [9] and Theorem 4.5 in [11] (e.g., see [31]), or resort to the final value theorem (e.g., see [36]).

From Remark 1A, it is known that output tracking error of each follower agent converges to zero when each follower agent is subject to constant external disturbance and leader has constant output. The following intuitive question now arises: Does the output tracking error of each follower agent still converge to zero if the external disturbances and the output of the leader converge to constant vectors? Since Theorem 1A is not used to answer this question, the following corollary may now be useful.

COROLLARY 2A. Let Assumptions 1A, 2A, and 3A hold. If $A_g$ is Hurwitz, $\lim_{t \to \infty} \delta_i(t) = \delta_i^* \in \mathbb{R}^{n_i}$, $\forall i \in \mathcal{N}$ and $\lim_{t \to \infty} y_0(t) = r^* \in \mathbb{R}^l$ ($\delta_i^*$ for all $i \in \mathcal{N}$ and $r^*$ are finite), and $\dot{\delta}_i(t)$ for all $i \in \mathcal{N}$ and $\dot{y}_0(t)$ is uniformly continuous on $[0, \infty)$, then $\lim_{t \to \infty} e_i(t) = 0$, $\forall i \in \mathcal{N}$.

Proof. Since the assistant system in equation (128) is linear time-invariant and $A_g$ is Hurwitz, equation (128) is input-to-state stable. Since $\lim_{t \to \infty} y_0(t) = r^*$ and $\dot{y}_0(t)$ is uniformly continuous on $[0, \infty)$, $\lim_{t \to \infty} \dot{y}_0(t) = 0$ from 1 number of independent applications of Barbalat's lemma. Thus, $\lim_{t \to \infty} \dot{y}_{0a}(t) = 0$. Similarly, $\lim_{t \to \infty} \dot{\delta}(t) = 0$. It now follows from the derivation given after Definition 4.6 in [5] that $\lim_{t \to \infty} \dot{\omega}(t) = 0$ implies $\lim_{t \to \infty} \zeta(t) = 0$ owing to the input-to-state stability of equation (128). Finally, $\lim_{t \to \infty} e_i(t) = 0$, $\forall i \in \mathcal{N}$, follows from Lemma 2A.

REMARK 3A. It is clear from the proof of Corollary 2A that if $A_g$ is Hurwitz, $\lim_{t \to \infty} \dot{\delta}_i(t) = 0$, $\forall i \in \mathcal{N}$, and $\lim_{t \to \infty} \dot{y}_0(t) = 0$, then $\lim_{t \to \infty} e_i(t) = 0$, $\forall i \in \mathcal{N}$. That is, asymptotic synchronization can be achieved even if the external disturbances and the output of the leader do not converge to constant vectors. For example, $\ln(t+1)$ does not have a limit but its derivative $1/(t+1)$ tends to zero as $t \to \infty$.

Agent-wise Local Sufficient Stability Condition. The main purpose of this section is to derive agent-wise local sufficient condition that provides Hurwitz $A_g$. For this purpose, the stabilizability and detectability of the global dynamics given by equations (115) and (116) is established. Then, agent-wise local sufficient condition are derived, which provides input-output stability of the global dynamics, by applying a version of the small gain theorem from Theorem 6.2.2.12 in [32]. The input-output stability of global dynamics by itself may not imply that $A_g$ is Hurwitz. Therefore, stabilizability and detectability of finite-dimensional linear time-invariant systems should be carefully tracked to rule out the possibility of unstable hidden modes, and hence, conclude from input-output stability that system matrix is Hurwitz.

For the sake of completeness, a well-known converse theorem (e.g., see Corollary 9.1.80 in [2]) is restated in Theorem 2A using global dynamics given by equations (115) and (116). For finite-dimensional linear time-invariant systems, $\mathcal{L}_2$ stability and uniform bounded-input, bounded-output stability are equivalent notions of input-output stability and are used interchangeably in the literature (e.g., see Remark 2 in [13]). Based on Theorem 2A, the derived agent-wise local sufficient condition for input-output stability provides Hurwitz $A_g$.

THEOREM 2A [2]. Suppose that the pair $(A_g, B_g)$ is stabilizable and the pair $(A_g, C_g)$ is detectable. If the linear time-invariant system given by equations (115) and (116) is $\mathcal{L}_2$ stable, then $A_g$ is Hurwitz.

Stabilizability and Detectability of Global Multiagent System Dynamics. In order to derive an agent-wise local sufficient condition, Theorem 2A is used. Thus, it is first needed to establish the stabilizability of the pair $(A_g, B_g)$ and the detectability of the pair $(A_g, C_g)$. These are given in Lemma 3A and Lemma 4A, respectively.

LEMMA 3A. If Assumptions 2A and 3A hold, then the pair $(A_g, B_g)$ is controllable.

Proof. Define the following matrix $$Q(\kappa) \triangleq \begin{bmatrix} A_m - \kappa I_{\bar{n}} & B_m & I_{\bar{n}} & 0 \\ [(I_N - FA) \otimes I_l]C & -\kappa I_{Nl} & 0 & -FK \otimes I_l \end{bmatrix}, \quad (135)$$

where $\kappa \in \mathbb{C}$. By Popov-Belevitch-Hautus test for controllability, the pair $(A_g, B_g)$ is controllable if and only if rank $(Q(\kappa)) = \bar{n} + Nl$, $\forall \kappa \in \mathbb{C}$. Note that rank $(I_{\bar{n}}) = \bar{n}$ and rank $(-\kappa I_{Nl}) = Nl$ if $\kappa \neq 0$. Thus, rank $(Q(\kappa)) = \bar{n} + Nl$ if $\kappa \neq 0$. Furthermore, $A_g - \kappa I_{\bar{n}+Nl} = A_g$ if $\kappa = 0$. Recall from Lemma 1A that $A_g$ is nonsingular by Assumptions 2A and 3A. Thus, rank $(Q(0)) = \bar{n} + Nl$. Now, considering them together (i.e., $\kappa \neq 0$ and $\kappa = 0$), it is established that rank $(Q(\kappa)) = \bar{n} + Nl$, $\forall \kappa \in \mathbb{C}$.

LEMMA 4A. If Assumptions 2A and 3A hold and $A_{mi}$ is Hurwitz for all $i \in \mathcal{N}$, then the pair $(A_g, C_g)$ is detectable.

Proof. An example goal is to show that if $\omega(t) \equiv 0$ and $y(t) \equiv 0$, then $\eta(t) \to 0$ as $t \to \infty$. For this purpose, first let $\omega(t) \equiv 0$, then rewrite equations (115) and (116) as two interconnected systems given by $$\dot{x}(t) = A_m x(t) + B_m z(t), \quad x(0) = x_0, \quad t \geq 0, \quad (136)$$

$$y(t) = Cx(t), \quad (137)$$

and $$\dot{z}(t) = [(I_N - FA) \otimes I_l]y(t), \quad z(0) = z_0, \quad t \geq 0 \quad (138)$$

One can show detectability of the pair $(A_g, C_g)$ from Popov-Belevitch-Hautus test for detectability (i.e., Theorem 16.5 in [6]). For that proof, detectability counterpart of $Q(\kappa)$ needs to be represented as a multiplication of two matrices and Corollary 2.5.10 in [1] should be applied. Since the presented proof requires less space, it is preferred.

Next, let $y(t) \equiv 0$. Then, from equation (138), $\dot{z}(t) \equiv 0$, and hence, $z(t) \equiv z_0$. To show that $z_0 = 0$, a contradiction argument as follows can be used. Suppose $z_0 \neq 0$ and take Laplace transform of equations (136) and (137). Thus $$Y(s) = C(sI - A_m)^{-1} B_m Z(s) + C(sI - A_m)^{-1} x_0, \quad (139)$$

where $Z(s) = 1/s z_0$. Since $A_{mi}$ is Hurwitz for all $i \in \mathcal{N}$, $A_m$ is Hurwitz. Therefore, a final value theorem as follows can be applied:

$$\lim_{t \to \infty} y(t) = \lim_{s \to 0} sY(s), \quad (140)$$

$$= \lim_{s \to 0} C(sI - A_m)^{-1} B_m z_0 + sC(sI - A_m)^{-1} x_0,$$

$$= -CA_m^{-1} B_m z_0.$$

It is explained in Lemma 1A that $CA_m^{-1}B_m$ is nonsingular due to the Assumption 3A. Thus, it implies that ker $(-CA_m^{-1}B_m) = \{0\}$. Since $z_0 \neq 0$, $\lim_{t \to \infty} y(t) \neq 0$ that is a contradiction to the fact that $y(t) \equiv 0$; therefore, $z_0 = 0$.

Until now, it has been established that if $\omega(t) \equiv 0$ and $y(t) \equiv 0$, then $z(t) \equiv 0$. To conclude that $\eta(t) \to 0$ as $t \to \infty$, it should be shown that $x(t) \to 0$ as $t \to \infty$. Note that $z(t)$ and $y(t)$ are the input and the output of the system equations (136) and (137), respectively. Recall that $A_m$ is Hurwitz, $y(t) \equiv 0$, and $z(t) \equiv 0$. Thus, from equations (136) and (137), $x(t) \to 0$ as $t \to \infty$.

REMARK 4A. Stabilizability (controllability implies stabilizability) and detectability of the global dynamics given by equations (115) and (116) do not require any information from graph topology (except the necessary condition given in Assumption 2A). Compared to stabilizability, detectability of the global dynamics is established if $A_{mi}$ is also Hurwitz for all $i \in \mathcal{N}$. By Assumption 4A, notice that there always exists $K_{li}$ such that $A_{mi}$ is Hurwitz for all $i \in \mathcal{N}$.

A Small Gain Analysis. In this subsection, a version of the small gain theorem given in [32] is used, which is proposed for large-scale systems, to establish the finite gain $\mathcal{L}_2$ stability of the global dynamics in equations (115) and (116). By applying Theorem 2A, the agent-wise local sufficient condition for stability of $A_g$ can be determined.

Define $\xi_i(t) \triangleq [x_i^T(t), z_i^T(t)]^T$ for $i \in \mathcal{N}$ and consider the dynamics of each follower given by equations (101) and (108) with equation (112)

$$\dot{\xi}_i(t) = \bar{A}_i \xi_i(t) + \bar{B}_i \mu_i(t) + B_{fi} v_i(t), \quad \xi_i(0) = \xi_{i0}, \quad t \geq 0, \quad (141)$$

where $$\bar{A}_i = \begin{bmatrix} A_i & 0 \\ C_i & 0 \end{bmatrix}, \quad \bar{B}_i = \begin{bmatrix} B_i \\ 0 \end{bmatrix}, \quad B_{fi} = \begin{bmatrix} \phi_i^{-1} I_{n_i} & 0 \\ 0 & -I_l \end{bmatrix},$$

$$v_i(t) = [\phi_i \delta_i^T(t), \mu_i^T(t)]^T, \quad \mu_i(t) = \frac{1}{d_i + k_i}\left[\sum_{j \in N_i} a_{ij} y_j(t) + k_i y_0(t)\right],$$

and a positive constant $\phi_i$ is introduced to have control over $B_{fi}$, which affects the gain of the follower agents. Using equation (109), the definition of $A_{mi}$ and $B_{mi}$ and recalling equation (102), the dynamics of each follower can equivalently be represented as $$\dot{\xi}_i(t) = A_{fi} \xi_i(t) + B_{fi} v_i(t), \quad \xi_i(0) = \xi_{i0}, \quad t \geq 0 \quad (142)$$

$$y_i(t) = C_{fi} \xi_i(t), \quad (143)$$

where $$A_{fi} = \begin{bmatrix} A_{mi} & B_{mi} \\ C_i & 0 \end{bmatrix}$$

and $C_{fi} = [C_i \; 0]$. The transfer matrix of the system equations (142) and (143), which is denoted by $g_i(s)$, satisfies $$g_i(s) = C_{fi}(sI - A_{fi})^{-1} B_{fi}. \quad (144)$$

Assumptions 4A and 5A ensure the stabilizability of the pair $(\bar{A}_i, \bar{B}_i)_i$ for all $i \in \mathcal{N}$. This can be verified by Lemma 1.26 in [8] with $(G_1, G_2) = (0, I_l)$ and $D = 0$. Therefore, $K_{1i}$ and $K_{2i}$ can always be chosen such that $A_{fi}$ is Hurwitz. If $A_{fi}$ is Hurwitz for all $i \in \mathcal{N}$, then it is concluded from Corollary 5.2 in [9] that for all $i \in \mathcal{N}$, the system given in equations (142) and (143) is $\mathcal{L}_p$ stable with finite gain for any $p \in [1, \infty]$. For example, for $p = 2$, it follows from Theorem 5.4 in [9] that the gain of the system satisfies $$\gamma_i = \sup_{\omega \in \mathbb{R}} \|g_i(j\omega)\|_2 < \infty, \; \forall \; i \in \mathcal{N}. \quad (145)$$

Conversely, equations (142) and (143) are stabilizable and detectable for all $i \in \mathcal{N}$ when $A_m$ is Hurwitz for all $i \in \mathcal{N}$ and Assumption 3A holds. Specifically, since rank $(B_{fi}) = n_i + l$, the pair $(A_{fi}, B_{fi})$ is controllable from controllability matrix test (i.e., Theorem 12.1 in [6]). Furthermore, by following the similar steps in the proof of Lemma 4A, it can be shown that if $A_{mi}$ is Hurwitz, the pair $(A_{fi}, C_{fi})$ is detectable under Assumption 3A. Therefore, if all poles of $g_i(s)$ have negative real part ($\gamma_i$ is finite) for all $i \in \mathcal{N}$, then $A_{fi}$ is Hurwitz for all $i \in \mathcal{N}$.

THEOREM 3A. Consider Assumptions 2A and 3A. Let $A_{mi}$ be Hurwitz for all $i \in \mathcal{N}$. If $$\rho(\Gamma)\rho(FA) < 1, \tag{146}$$

then $A_g$ is Hurwitz, where $\Gamma \triangleq \text{diag}(\gamma_1, \ldots, \gamma_N)$.

Proof. It is first shown that equations (115) and (116) are $\mathcal{L}_2$ stable with finite gain. This part of the proof can be regarded as an application of Theorem 6.2.2.12 in [32]. Since F is finite, which is owing to Assumption 2A, and A is finite, then F is finite from (46). Therefore, under the stated assumptions and conditions, $A_{fi}$ is Hurwitz for all $i \in \mathcal{N}$, and hence, equations (142) and (143) are $\mathcal{L}_2$ stable with finite gain $\gamma_i$ given by equation (145) for all $i \in \mathcal{N}$. Now, the following inequality is determined, $$\|y_{i\tau}(t)\|_{\mathcal{L}_2} \leq \gamma_i \|v_{i\tau}(t)\|_{\mathcal{L}_2}, \forall \tau \in [0,\infty), \forall i \in \mathcal{N} \tag{147}$$

Using the definition $v_i(t)$, Minkowski's inequality, and letting $y_0(t) \in \mathcal{L}_2$ and $\delta_i(t) \in \mathcal{L}_2$ for all $i \in \mathcal{N}$, the inequality from equation (147) is given by $$\|y_{i\tau}(t)\|_{\mathcal{L}_2} \leq \gamma_i \|\phi_i \delta_i(t)\|_{\mathcal{L}_2} + \gamma_i \left\| \frac{1}{d_i + k_i} \sum_{j \in N_i} a_{ij} y_{j\tau}(t) \right\|_{\mathcal{L}_2} + \gamma_i \left\| \frac{1}{d_i + k_i} k_i y_0(t) \right\|_{\mathcal{L}_2}, \forall \tau \in [0, \infty), \forall i \in \mathcal{N}. \tag{148}$$

Let $p_\tau \triangleq [\|y_{1\tau}(t)\|_{\mathcal{L}_2}, \ldots, \|y_{N\tau}(t)\|_{\mathcal{L}_2}]^T$, $\bar{y}_0 \triangleq \|y_0(t)\|_{\mathcal{L}_2} 1_N$, $\bar{\delta} \triangleq [\|\delta_1(t)\|_{\mathcal{L}_2}]^T$, and $\Phi \triangleq \text{diag}(\phi_1, \ldots, \phi_N)$. From equation (148), $$p_\tau \leq \Gamma \Phi \bar{\delta} + \Gamma FA p_\tau + \Gamma FK \bar{y}_0, \forall \tau \in [0, \infty), \tag{149}$$

where equation (149) can also be written as $$(I_N - \Gamma FA) p_\tau \leq \Gamma \Phi \bar{\delta} + \Gamma FK \bar{y}_0, \forall \tau \in [0, \infty). \tag{150}$$

Note that $\Gamma$ is positive-definite diagonal matrix $\rho(\Gamma) = \max_{1 \leq i \leq N} \gamma_i$, and FA is nonnegative matrix. Then, the following inequality is obtained from Lemma 8 in [7]

$$\rho(\Gamma FA) \leq \rho(\Gamma) \rho(FA). \tag{151}$$

Since equation (146) holds, we have the following from equation (151)

$$\rho(\Gamma FA) < 1. \tag{152}$$

From Lemma 6.2.1.8 and Lemma 6.2.1.9 in [32], it is known that $I_N - \Gamma FA$ has an inverse that has all nonnegative elements because $\Gamma FA$ is nonnegative matrix and equation (152) holds. Since $(I_N - \Gamma FA)^{-1}$ is nonnegative matrix, both sides of equation (150) are can be multiplied by $(I_N - \Gamma FA)^{-1}$. Thus, $$p_\tau \leq (I_N - \Gamma FA)^{-1} \Gamma \Phi \bar{\delta} + (I_N - \Gamma FA)^{-1} \Gamma FK \bar{y}_0, \forall \tau \in [0, \infty). \tag{153}$$

Since the right hand side of equation (153) is independent of t it is concluded from Lemma 2.1.12 in [32] that $y_i(t) \in \mathcal{L}_2$ for all $i \in \mathcal{N}$. Hence, equation (153) directly implies that there exists $\bar{\gamma}$ such that $$\|y(t)\|_{\mathcal{L}_2} \leq \bar{\gamma} \|\omega(t)\|_{\mathcal{L}_2}. \tag{154}$$

It follows from equation (154) that equation (115) and (116) are $\mathcal{L}_2$ stable with finite gain. Since Assumptions 2A and 3A hold and $A_{mi}$ is Hurwitz for all $\in \mathcal{N}$, equations (115) and (116) are stabilizable and detectable from Lemma 3A and Lemma 4A. Therefore, $A_g$ is Hurwitz from Theorem 2A.

REMARK 5A. If Assumptions 2A, 3A, 4A, and 5A hold, $K_{1i}$, $K_{2i}$ are designed such that $A_{mi}$ is Hurwitz for all $i \in \mathcal{N}$, and the sufficient condition given by equation (146) is satisfied, then $A_g$ is Hurwitz from Theorem 3A. In addition to the foregoing assumptions, if Assumption 1A holds, then uniformly ultimately bounded output tracking error between output of each follower and the output of the leader is achieved by Theorem 1A. Similar to [7,16, 30], Theorem 3A provides agent-wise local condition with a clear link between input-output stability and internal stability of global dynamics given by equations (115) and (116). In contrast to the distributed output regulation problems considered in [27,7,16,29,30], the controller design described herein does not depend on the dynamics of an exosystem.

REMARK 6A. Since $\rho(\Gamma) = \max_{1 \leq i \leq N} \gamma_i$, the sufficient condition given in equation (146) basically implies $\gamma_i \rho(FA) < 1$, $\forall i \in \mathcal{N}$. Therefore, Theorem 3A provides agent-wise local sufficient condition for controller design. If the sufficient condition given by equation (146) in Theorem 3A is replaced with equation (152), it is clearly seen that Theorem 3A is still valid and equations (152) decreases conservatism in sufficient condition. However, equations (152) does not provide agent-wise local sufficient condition anymore. It can be an alternative global sufficient condition, which is together with Hurwitz $A_{mi}$ for all $i \in \mathcal{N}$, to the one given in Theorem 1A which states that $A_g$ is Hurwitz. It is also noted that the sufficient condition in equation (146) can be satisfied by solving algebraic Riccati equation (e.g., see Lemma 9 in [7]) or linear matrix inequality (e.g., see Theorem 6 in [30]).

For acyclic directed graphs, derived distributed criterion for controller design is not only agent-wise but also graph-wise local except for the necessary condition given by Assumption 2A. It is shown in the next result.

COROLLARY 3A. Consider Assumptions 2A and 3A. Let $A_{mi}$ be Hurwitz and $\gamma_i$ is finite for all $i \in \mathcal{N}$. If the directed graph $\mathcal{G}$ is acyclic (i.e., contains no loop), then $A_g$ is Hurwitz.

Proof. Similar to [34,29], the nodes in $\mathcal{G}$ can be relabeled such that $i > j$ if $(v_i, v_j) \in E$ since $\mathcal{G}$ is acyclic. Then, the adjacency matrix A of the directed $\mathcal{G}$ is lower triangular with zero diagonal entries. In this case, FA is also lower triangular matrix with zero diagonal entries. Thus, $\rho(FA) = 0$ and sufficient condition given by equation (146) in Theorem 3A is automatically satisfied. It now follows from Theorem 3A that $A_g$ is Hurwitz.

REMARK 7A. For acyclic graph, obtaining Hurwitz $A_g$ is reduced to designing Hurwitz $A_{mi}$ together with any finite $\gamma_i$ is finite for all $i \in \mathcal{N}$ if Assumptions 2A, 3A, 4A, and 5A hold. In terms of being agent-wise and graph-wise local, this result is consistent with the results in [34,29] which are obtained by applying similarity transformation.

To illustrate the performance of the proposed distributed controller architecture described in this embodiment, the following two numerical examples are presented. The first example has nonlinear leader dynamics and the second one has linear leader dynamics. For both examples, five follower agents are considered with the following system, input, and output matrices:

$$A_{1,4,5} = \begin{bmatrix} -1 & 1 \\ 0.5 & 0 \end{bmatrix}, B_{1,4,5} = \begin{bmatrix} 1 & 0.4 \\ 0 & 0.2 \end{bmatrix}, C_{1,4,5} = \begin{bmatrix} 1.2 & -0.4 \\ 0 & 1 \end{bmatrix},$$

-continued $$A_{2,3} = \begin{bmatrix} 0 & 1 & 0 & -0.5 \\ 0 & 2 & 1 & 0 \\ 0 & 0 & 0 & 1 \\ 0.2 & 0 & 0 & 0 \end{bmatrix}, B_{2,3} = \begin{bmatrix} 0 & 0 & 1 \\ 2 & 0 & 0 \\ 0 & -1 & 0 \\ 3 & 0 & 0 \end{bmatrix},$$

$$C_{2,3} = \begin{bmatrix} 1 & 0 & 0 & 0 \\ 0 & 1 & 0 & 0 \end{bmatrix},$$

and the augmented graph $\mathcal{G}$ shown in FIG. 1. Dynamics of follower agents satisfy Assumptions 4A and 5A. It is also clear from FIG. 1 that Assumption 2A is satisfied. In the simulations, weighting gains are equal to 1 (i.e., $k_{1,2}=1$).

Now, linear quadratic theory is used to design $K_{1i}$ and $K_{2i}$. In particular, $Q_{1,4,5}=\text{diag}(10,1,10,1)$ and $R_{1,1}=\text{diag}(1,1)$ are used to penalize $\xi_{1,4,5}(t)$ and $u_{1,4,5}(t)$, respectively. Similarly, $Q_{2,3}=\text{diag}(1,1,1,1,2,2)$ and $R_{2,3}=\text{diag}(1,1,1)$ are used to penalize $\xi_{2,3}(t)$ and $u_{2,3}(t)$, respectively. With these design parameters, Assumption 3A is satisfied and $A_{mi}$ is Hurwitz for all $i \in \mathcal{N}$. For the given graph, $\rho(FA)=0.6334$. Letting $\phi_i=100$ for all $i \in \mathcal{N}$, then $\rho(\Gamma)=1.0156$. Thus, $A_g$ is Hurwitz from Theorem 3A. In the simulations, initial conditions for the follower agents are as follows $x_{10}=[1\ 0.6]^T$, $x_{20}=[-1\ 0\ -0.2\ 0]^T$, $x_{30}=[-0.8\ -0.4\ 0\ 0]^T$, $x_{40}=[0.6\ 0]^T$, $x_{50}=[0\ 0.5]^T$.

EXAMPLE 1. In this example, the dynamics of the leader is nonlinear and has the form:

$\dot{x}_{0_1}(t)=-x_{0_1}(t)-x_{0_1}^3(t)+x_{0_2}(t)$, $x_{0_1}(0)=x_{0_{10}}$, $t \geq 0$, $\dot{x}_{0_2}(t)=-x_{0_1}(t)-x_{0_2}(t)+x_{0_3}(t)$, $x_{0_2}(0)=x_{0_{20}}$, $t \geq 0$, $\dot{x}_{0_3}(t)-x_{0_3}^3(t)+u_0(t)$, $x_{0_3}(0)=x_{0_{30}}$, $t \geq 0$ $y_{0_1}(t)=x_{0_1}(t)$, $y_{0_2}(t)=x_{0_2}(t)$.

This leader dynamics is from the exercise problems given in [10]. Regarding $x_{0_3}(t)$ as a control input to the state model that consists $x_{0_1}(t)$ and $x_{0_2}(t)$, given leader dynamics can be evaluated as a cascade system. From Example 4.25 in [9], scalar system, which has $x_{0_3}(t)$ state, is input-to-state stable. One can show that state model that consists of $x_{0_1}(t)$ and $x_{0_2}(t)$ is also input-to-state stable by Theorem 4.19 in [9]. Therefore, given leader dynamics, which is a cascade system, is input-to-state stable. In other words, if $u_0(t)$ is piecewise continuous and bounded, then $x_{0_1}(t)$, $x_{0_2}(t)$, and $x_{0_3}(t)$ are bounded. Note that $\dot{y}_{0_1}(t)=\dot{x}_{1_0}(t)$ and $\dot{y}_{0_2}(t)=\dot{x}_{0_2}(t)$. Thus, $\dot{y}_0(t)$ is bounded. In the simulation, the input of leader is taken as $u_0(t)=$ $$\begin{cases} 0.1t, & 0 \leq t < 100, \\ 0.1t - 2\sin(0.1t)e^{-0.01(t-100)}, & 100 \leq t < 200, \\ 20, & t \geq 200 \end{cases}$$

and hence, there exists $\beta$ that satisfies equation (105). Moreover, follower agents are subject to external disturbances, which satisfy equation (104), as follows: $\delta_1(t)=[-0.2,\ 1-e^{-0.02t}]^T$, $\delta_2(t)=[0.1\ \cos(0.1t)\ 0,\ 0,\ -0.1]^T$, $\delta_3(t)=[0,\ 0,\ 0.05\ \sin(4t),\ 0]^T$, $\delta_4(t)=[0.5,\ 0.4]^T$, and $\delta_5(t)=[0.01t\ 0]^T$, $t \geq 0$. Thus, Assumption 1A holds for this example.

Figure 2:
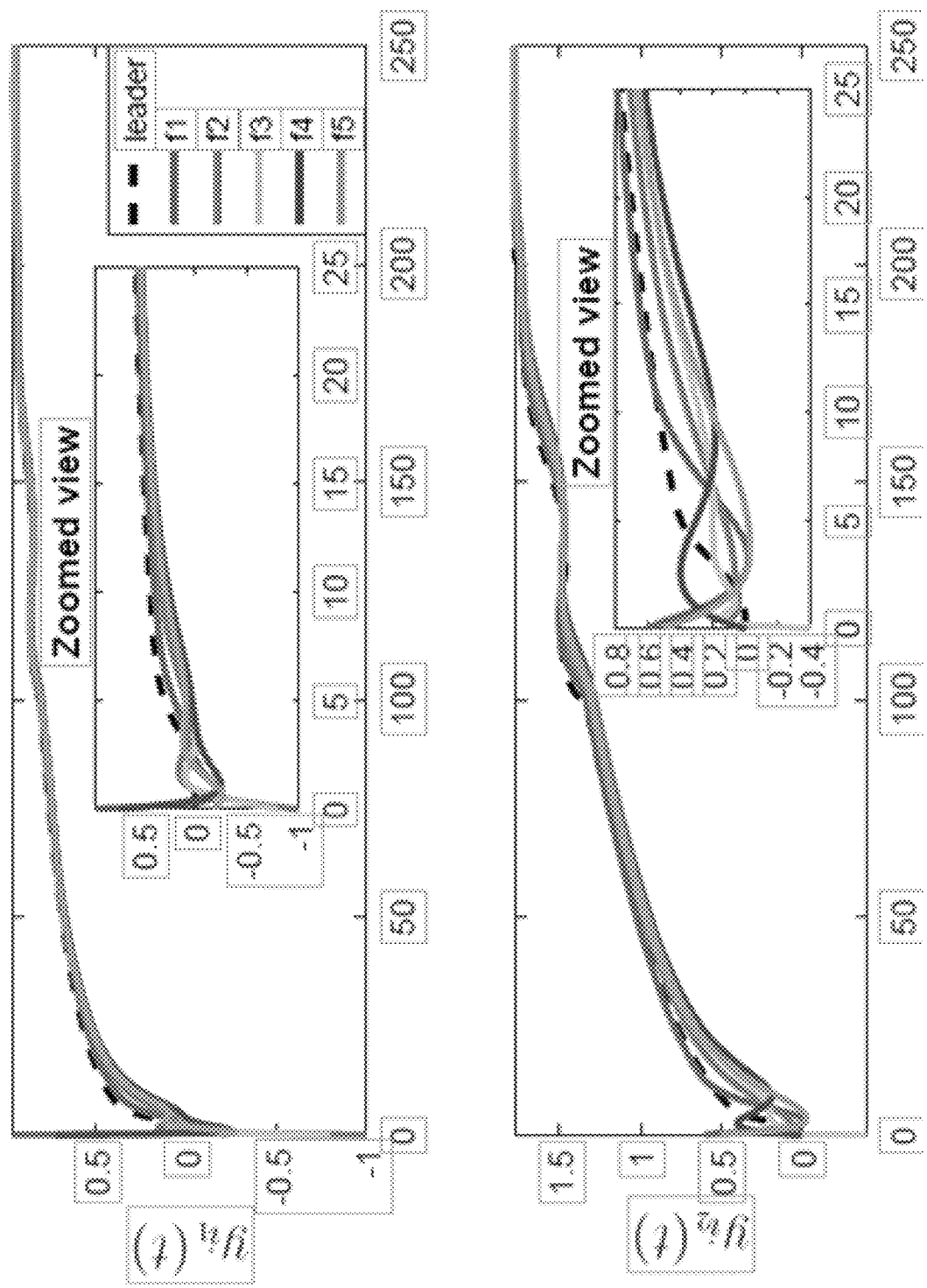
FIG. 2 are graphs that represent example output responses of a multi-agent system with a leader having nonlinear dynamics, in accordance with the first embodiment.

FIG. 2 illustrates that the output of each follower agent closely tracks the output of the leader. That is, output tracking error is uniformly ultimately bounded as expected by Theorem 1A.

EXAMPLE 2. The dynamics of the leader is now given by the following linear system $$\dot{x}_0(t) = \begin{bmatrix} 0 & 1 \\ -0.25 & -1 \end{bmatrix} x_0(t) + \begin{bmatrix} 0 \\ 0.25 \end{bmatrix} u_0(t),$$

$$x_0(0) = x_{00}, t > 0, y_0(t) = \begin{bmatrix} 1 & 0 \\ -0.5 & 1 \end{bmatrix} x_0(t),$$

where $u_0(t)=1$, for $t \geq 0$. Since the leader has linear time-invariant dynamics and its system matrix is Hurwitz, we have input-to-state stable leader dynamics. Furthermore, by applying final value theorem, the steady-state value of the output is found to be equal to $[1-0.5]^T$ (i.e., $r^*=[1-0.5]^T$). In addition, note that $\dot{y}_0(t)$ is uniformly continuous since $\ddot{y}_0(t)$ is bounded owing to the boundedness of $x_0(t)$, $u_0(t)$, and $\dot{u}_0(t)$. Furthermore, external disturbances are given as follows: $\delta_1(t)=[0.2\ -0.5+e^{-0.5t}]^T$, $\delta_2(t)=[0.3\ 0\ -0.3e^{-0.2t}\ \sin(t)\ 0]^T$, $\delta_3(t)=[0\ 0.3\ 0\ -0.2]^T$, $\delta_4(t)=[0.5\ 0.1e^{-0.4t}\ \sin(4t)]^T$, $\delta_5(t)=[1-e^{-0.3t}\ 0]^T$. Similar to $y_0(t)$, given disturbances satisfy the conditions in Corollary 2A. Thus, Corollary 2A guarantees asymptotic synchronization and this fact is demonstrated in FIG. 3.

It is worth noting that the distributed controller gains are selected without using any information from leader dynamics and external disturbances. Same controller gains are used for the examples which are presented in this disclosure.

References Related to the First Embodiment

[1] D. S. Bernstein. Matrix mathematics: Theory, facts, and formulas. Princeton University Press, 2009.

[2] F. M. Callier and C. A. Desoer. Linear system theory. Springer-Verlag, 1991.

[3] W. Cao, J. Zhang, and W. Ren. Leader-follower consensus of linear multi-agent systems with unknown external disturbances. Systems & Control Letters, 82:64-70, 2015.

[4] B. A. Francis and W. M. Wonham. The internal model principle of control theory. Automatica, 12(5), 1976.

[5] W. M. Haddad and V. Chellaboina. Nonlinear dynamical systems and control: A Lyapunov-based approach. Princeton University Press, 2008.

[6] J. P. Hespanha. Linear systems theory. Princeton University Press, 2009.

[7] C. Huang and X. Ye. Cooperative output regulation of heterogeneous multi-agent systems: an $H_\infty$ criterion. IEEE Transactions on Automatic Control, 59(1):267-273, 2014.

[8] J. Huang. Nonlinear output regulation problem: Theory and applications. SIAM, 2004.

[9] H. K. Khalil. Nonlinear systems. Prentice Hall, 2002.

[10] H. K. Khalil. Introduction to nonlinear systems analysis and nonlinear feedback control. Module 8. International Graduate School on Control—European Embedded Control Institute, Yildiz Technical University, 2015.

[11] H. K. Khalil. Nonlinear control. Pearson, 2015.

[12] E. Kofman. Non conservative ultimate bound estimation in LTI perturbed systems. Automatica, 41:1835-1838, 2005.

[13] N. Kottenstette, M. J. McCourt, M. Xia, V. Gupta, and P. J. Antsaklis. On relationships among passivity, positive realness, and dissipativity in linear systems. Automatica, 50(4), 2014.

[14] E. Lavretsky and K. A. Wise. Robust and adaptive control with aerospace applications. Springer-Verlag, 2013.

[15] F. L. Lewis, H. Zhang, K. Hengster-Movric, and A. Das. Cooperative control of multi-agent systems: Optimal and adaptive design approaches. Springer, 2014.

[16] Y. Li, X. Wang, J. Xiang, and W. Wei. Synchronised output regulation of leader-following heterogeneous networked systems via error feedback. International Journal of Systems Science, 47(4), 2015.

[17] Z. Li, Z. Duan, and F. L. Lewis. Distributed robust consensus control of multi-agent systems with heterogeneous matching uncertainties. Automatica, 50(3), 2014.

[18] Z. Li, X. Liu, W. Ren, and L. Xie. Distributed tracking control for linear multiagent systems with a leader of bounded unknown input. IEEE Transactions on Automatic Control, 58(2):518-523, 2013.

[19] M. Mesbahi and M. Egerstedt. Graph theoretic methods in multiagent networks. Princeton University Press, 2010.

[20] H. Modares, S. P. Nageshrao, G. A. Delgado Lopes, R. Babuska, and F. L. Lewis. Optimal model-free output synchronization of heterogeneous systems using off-policy reinforcement learning. Automatica, 71:334-341, 2016.

[21] R. Olfati-Saber, J. A. Fax, and R. M. Murray. Consensus and cooperation in networked multi-agent systems. Proceedings of the IEEE, 95(1):215-233, 2007.

[22] Z. Peng, D. Wang, and H. Zhang. Cooperative tracking and estimation of linear multi-agent systems with a dynamic leader via iterative learning. International Journal of Control, 87(6), 2014.

[23] W. Ren and Y. Cao. Distributed coordination of multi-agent networks: Emergent problems, models, and issues. Springer-Verlag, 2011.

[24] S. B. Sarsilmaz and T. Yucelen. On control of heterogeneous multiagent systems with unknown leader dynamics. In ASME Dynamic Systems and Control Conference, 2017.

[25] P. N. Shivakumar and K. H. Chew. A sufficient condition for nonvanishing of determinants. Proceedings of the American Mathematical Society, 43(1):63-66, 1974.

[26] S. Skogestad and I. Postlethwaite. Multivariable feedback control: Analysis and design. Wiley, 2005.

[27] Y. Su and J. Huang. Cooperative output regulation of linear multiagent systems. IEEE Transactions on Automatic Control, 57(4), 2012.

[28] Y. Tang. Leader-following coordination problem with an uncertain leader in a multi-agent system. IET Control Theory and Applications, 8(10), 2014.

[29] F. Adib Yaghmaie, F. L. Lewis, and R. Su. Output regulation of heterogeneous linear multi-agent systems with differential graphical game. International Journal of Robust and Nonlinear Control, 26:2256-2278, 2016.

[30] F. Adib Yaghmaie, F. L. Lewis, and R. Su. Output regulation of linear heterogeneous multi-agent systems via output and state feedback. Automatica, 67:157-164, 2016.

[31] D. Tran and T. Yucelen. On control of multiagent formations through local interactions. In IEEE Conference on Decision and Control, 2016.

[32] M. Vidyasagar. Input-output analysis of large-scale interconnected systems: Decomposition, well-posedness, and stability. Springer-Verlag, 1981.

[33] M. Vidyasagar. Nonlinear systems analysis. Prentice Hall, 1993.

[34] X. Wang, Y. Hong, J. Huang, and Z.-P. Jiang. A distributed control approach to a robust output regulation problem for multiagent linear systems. IEEE Transactions on Automatic Control, 55(12):2891-2895, 2010.

[35] P. Wieland, R. Sepulchre, and F. Allgower. An internal model principle is necessary and sufficient for linear output synchronization. Automatica, 47(5), 2011.

[36] T. Yucelen and E. J. Johnson. Control of multivehicle systems in the presence of uncertain dynamics. International Journal of Control, 86(9):1540-1553, 2013.

[37] K. Zhou, J. C. Doyle, and K. Glover. Robust and optimal control. Prentice-Hall, 1996.

Second Embodiment

A standard notation is used in the second and third embodiments. Specifically, $\mathbb{R}$, $\mathbb{R}^n$, and $\mathbb{R}^{n \times m}$ respectively denote the sets of all real numbers, real column vectors, and n×m matrices; $1_n$ and $I_n$ respectively denote the n×1 vector of all ones and the n×n identity matrix; and "$\triangleq$" denotes equality by definition. In this disclosure, all real matrices are defined over the field of complex numbers. In this disclosure, write $(\bullet)^T$ for the transpose and $\|\bullet\|_2$ for the (induced) two norm of a matrix; $\sigma(\bullet)$ for the spectrum and $\rho(\bullet)$ for the spectral radius of a square matrix; $(\bullet)^{-1}$ for the inverse of a nonsingular matrix; and $\otimes$ for the Kronecker product. Finally, $\text{diag}(A_1, \ldots, A_n)$ is a block-diagonal matrix with entries $(A_1, \ldots, A_n)$ on its diagonal. Definition 4.4.4 in [1] is followed for the spectrum.

Next, the graph theoretical notation used in the second and third embodiments, which is based on [9], is concisely stated. In particular, consider a fixed (i.e., time-invariant) directed graph $\mathcal{G} = (\mathcal{V}, \mathcal{E})$, where $\mathcal{V} = \{v_1, \ldots, v_N\}$ is a nonempty finite set of N nodes and $\mathcal{E} \subset \mathcal{V} \times \mathcal{V}$ is a set of edges. Each node in $\mathcal{V}$ corresponds to a follower agent. There is an edge rooted at node $v_j$ and ended at $v_i$ (i.e. $(v_j, v_i) \in \mathcal{E}$ if and only if $v_i$ receives information from $v_j$. $\mathcal{A} = [a_{ij}] \in \mathbb{R}^{N \times N}$ denotes the adjacency matrix, which describes the graph structure; that is $a_{ij} > 0 \Leftrightarrow (v_j, v_i) \in \mathcal{E}$ and $a_{ij} = 0$ otherwise. Repeated edges and self loops are not allowed; that is $a_{ii} = 0$, $\forall i \in \mathcal{N}$ with $\mathcal{N} = \{1, \ldots, N\}$. The set of neighbors of node $v_i$ is denoted as $N_i = \{j | (v_j, v_i) \in \mathcal{E}\}$. In-degree matrix is defined as $\mathcal{D} = \text{diag}(d_1, \ldots, d_n)$ with $d_i = \Sigma_{j \in N_i} a_{ij}$. A directed path from node $v_i$ to node $v_j$ is a sequence of successive edges in the form of $\{(v_i, v_p), (v_p, v_q), \ldots, (v_r, v_j)\}$. If $v_i = v_j$, then the directed path is called a loop. A directed graph is said to have a spanning tree if there is a root node such that it has directed paths to all other nodes in the graph. A fixed augmented directed graph is defined as $\bar{\mathcal{G}} = (\bar{\mathcal{V}}, \bar{\mathcal{E}})$, where $\bar{\mathcal{V}} = \{v_0, v_1, \ldots, v_N\}$ is the set of N+1 nodes, including the leader node $v_0$ and all nodes in $\mathcal{V}$, and $\bar{\mathcal{E}} = \mathcal{E} \cup \mathcal{E}'$ is the set of edges with $\mathcal{E}'$ consisting of some edges in the form of $(v_0, v_i)$, $i \in \mathcal{N}$.

The concept of internal model introduced next slightly modifies Definition 1.22 and Remark 1.24 in [5].

Definition 1. Given any square matrix $A_0$, a triple of matrixes $(M_1, M_2, M_3)$ is said to incorporate a p-copy internal model of the matrix $A_0$ if $$M_1 = T \begin{bmatrix} S_1 & S_2 \\ 0 & G_1 \end{bmatrix} T^{-1}, M_2 = T \begin{bmatrix} S_3 \\ G_2 \end{bmatrix}, M_3 = T \begin{bmatrix} S_4 \\ 0 \end{bmatrix}, \quad (201)$$

or $$M_1 = G_1, M_2 = G_2, M_3 = 0, \quad (202)$$

where $S_l$, $l=1, 2, 3, 4$, is any matrix with appropriate dimension, T is any nonsingular matrix with an appropriate dimension, the zero matrix in $M_3$ has as many rows as those of G1, and $$G1=\text{diag}(\beta_1, \ldots, \beta_p), G_2=\text{diag}(\sigma_1, \ldots, \sigma_p),$$

where for $l=1, \ldots, p$, $\beta_l \in \mathbb{R}^{s_l \times s_l}$ and $\sigma_l \in \mathbb{R}^{s_l}$ satisfy the following conditions:

a) The pair $(\beta_l, \sigma_l)$ is controllable.

b) The minimal polynomial of $A_0$ equals the characteristic polynomial of $\beta_l$.

Problem Formulation. Consider a system of N (follower) agents with heterogeneous linear time-invariant dynamics subject to external disturbances over a fixed directed communication graph topology $\mathcal{G}$. The dynamics of agent $i \in \mathcal{N}$ can be given by $$\dot{x}_i(t)=A_i x_i(t)+B_i u_i(t)+\delta_i(t), x_i(0)=x_{i0}, t \geq 0,$$

$$y_i(t)=C_i x_i(t)+D_i u_i(t),$$

with state $x_i(t) \in \mathbb{R}^{n_i}$, input $u_i(t) \in \mathbb{R}^{m_i}$, output $y_i(t) \in \mathbb{R}^p$, and external disturbance $\delta_i(t)=E_{\delta_i}\delta(t) \in \mathbb{R}^{n_i}$, where $\delta(t) \in \mathbb{R}^{q_\delta}$ is a solution to the unknown disturbance dynamics with an initial condition. In addition, the reference trajectory to be tracked is denoted by $y_0(t)=R_r r_0(t) \in \mathbb{R}^p$, where $r_0(t) \in \mathbb{R}^{q_r}$ is a solution to the unknown leader dynamic with an initial condition.

Let $\omega(t) \triangleq [r_0^T(t), \delta^T(t)]^T \in \mathbb{R}^q$ be the solution of the unknown exosystem, where $q=q_r+q_\delta$. Instead of assuming that the exosystem has an unforced linear time-invariant dynamics with a known system matrix (for example, see [14, 4, 16]), this disclosure considers that the exosystem has (partially or completely) unknown dynamics. From this perspective, the exosystem can represent any (for example, linear or nonlinear) dynamics provided that its solution is unique and satisfies the conditions given later in Assumptions 1B and 2B.

Define $E_i \triangleq [0 \; E_{\delta_i}]$ and $R \triangleq [R_r \; 0]$. Furthermore, let $e_i(t) \triangleq y_i(t)-y_0(t)$ be the tracking error. The state of each agent and its tracking error can be defined as $$\dot{x}_i(t)=A_i x_i(t)+B_i u_i(t)+E_i \omega(t), x_i(0)=x_{i0}, t \geq 0, \quad (203)$$

$$e_i(t)=C_i x_i(t)+D_i u_i(t)-R\omega(t). \quad (204)$$

In this disclosure, the tracking error $e_i(t)$ is available to a nonempty proper subset of agents. If all agents observe the leader, decentralized controller can be designed for each agent even though the distributed controllers described herein are still applicable. In particular, if node $v_i$ observes the leader node $v_0$, then there exists an edge $(v_0, v_i)$ with weighting gain $k_i>0$; otherwise $k_i=0$. Each agent has also access to the relative output error; that is, $y_i(t)-y_j(t)$ for all $j \in N_i$. Similar to [16], the local virtual tracking error can be defined as $$e_{vi}(t) \triangleq \frac{1}{d_i+k_i}\left[\sum_{j \in N_i} a_{ij}(y_i(t)-y_j(t))+k_i(y_i(t)-y_0(t))\right]. \quad (205)$$

Next, three classes of distributed control laws are defined based on additional available information for each agent.

1) Dynamic State Feedback. If each agent has full access to its own state $x_i(t)$, then the dynamic state feedback control law can be defined as $$u_i(t)=K_{1i}x_i(t)+K_{2i}z_i(t), \quad (206)$$

$$\dot{z}_i(t)=G_{1i}z_i(t)+G_{2i}e_{vi}(t), z_i(0)=z_{i0}, t \geq 0, \quad (207)$$

where $z_i(t) \in \mathbb{R}^{z_{1i}}$ is the controller state and the quadruple $(K_{1i}, K_{2i}, G_{1i}, G_{2i})$ is described later herein.

2) Dynamic Output Feedback with Local Measurement. If each agent has local measurement output $y_{mi}(t) \in \mathbb{R}^{p_i}$ of the form $$y_{mi}(t)=C_{mi}x_i(t)+D_{mi}u_i(t), \quad (208)$$

then the dynamic output feedback control law with local measurement is given by $$u_i(t)=\overline{K}_i z_i(t), \quad (209)$$

$$\dot{z}_i(t)=M_{1i}z_i(t)+M_{2i}e_{vi}(t)+M_{3i}y_{mi}(t), z_i(0)=z_{i0}, t \geq 0, \quad (210)$$

where $z_i(t) \in \mathbb{R}^{z_{2i}}$ is the controller state and the quadruple $(\overline{K}_i, M_{1i}, M_{2i}, M_{3i})$ is described later herein.

3) Dynamic Output Feedback. If each agent does not have additional information; that is, the local virtual tracking error $e_{vi}(t)$ is the only available information to it, then the dynamic output feedback control law is given by $$u_i(t)=\overline{K}_i z_i(t), \quad (211)$$

$$\dot{z}_i(t)=M_{1i}z_i(t)+M_{2i}e_{vi}(t), z_i(0)=z_{i0}, t \geq 0, \quad (212)$$

where $z_i(t) \in \mathbb{R}^{z_{3i}}$ is the controller state and the triple $(\overline{K}_i, M_{1i}, M_{2i})$ is described later herein.

This disclosure makes the following first and second assumptions before define the problem.

ASSUMPTION 1B. $A_0 \in \mathbb{R}^{q \times q}$ has no eigenvalues with negative real parts.

ASSUMPTION 2B. There exist $k>0$ such that $$\|A_0\omega(t)-\dot{\omega}(t)\|_2 \leq k<\infty, \forall t \geq 0,$$

where $\dot{\omega}(t)$ is a piecewise continuous function in time. The definition given in page 650 of [7] is followed.

Assumption 1B is standard in linear output regulation theory (for example, see Remark 1.3 in [5]). Assumption 2B is required to show the ultimate boundedness of the tracking error and it automatically holds if the exosystem has an unforced linear time-invariant dynamics with the system matrix $A_0$.

Based on a definition of the linear cooperative output regulation problem in [14, 4], the problem considered in this disclosure can be defined as follows.

Definition 2. Given the system in equations (203) and (204) together with the exosystem, which satisfies Assumptions 1B and 2B, and the fixed augmented directed graph, find a distributed control law of the form of equations (206) and (207), or equation (209) and (210), or equations (211) and (212) such that:

a) The resulting closed-loop system matrix is Hurwitz.

b) The tracking error $e_i(t)$ is ultimately bounded with ultimate bound b for all initial conditions of the closed-loop system and for all $i \in \mathcal{N}$; that is, there exists $b>0$ and for each initial condition of the closed-loop system, there is $T \geq 0$ such that $\|e_i(t)\|_2 \leq b$, $\forall t \geq T$, $\forall i \in \mathcal{N}$.

c) If $\lim_{t \to \infty} A_0 \omega(t)-\dot{\omega}(t)=0$, then for all initial conditions of the closed-loop system $\lim_{t \to \infty} e_i(t)=0$, $\forall i \in \mathbb{R}$.

This disclosure makes the following addition assumptions to solve this problem.

ASSUMPTION 3B. The fixed augmented directed graph $\mathcal{G}$ has a spanning tree with the root node being the leader node.

ASSUMPTION 4B. The pair $(A_i, B_i)$ is stabilizable for all $i \in \mathcal{N}$.

ASSUMPTION 5B. For all $\lambda \in \sigma(A_0)$, $$\text{rank}\begin{bmatrix} A_i - \lambda I_{n_i} & B_i \\ C_i & D_i \end{bmatrix} = n_i + p, \forall\, i \in \mathcal{N}.$$

ASSUMPTION 6B. The triple $(G_{1i}, G_{2i}, 0)$ incorporates a p-copy internal model of $A_0$ for all $i \in \mathcal{N}$.

ASSUMPTION 7B. The pair $(A_i, C_{mi})$ is detectable for all $i \in \mathcal{N}$.

ASSUMPTION 8B. The pair $(A_i, C_i)$ is detectable for all $i \in \mathcal{N}$.

Assumption 3B is natural to solve the stated problem (for example, see Remark 3.2 in [9]). Similar to Assumption 1B, Assumptions 4B, 5B, 6B, 7B, and 8B are standard in linear output regulation theory (for example, see Chapter 1 of [5]). Assumptions 1B, 2B, 3B, 4B, 5B, and 6B can be used for dynamic state feedback. To utilize some results from dynamic state feedback in the absence of full state information, each agent requires the estimation of its own state. For this purpose, Assumption 7B and Assumption 8B are included for dynamic output feedback with local measurement and dynamic output feedback, respectively.

Solvability of the Problem

For the three different distributed control laws introduced previously herein, the solvability of the problem given in Definition 2 can be investigated. First, property a) of Definition 2 is assumed and it is shown, under mild conditions, that properties b) and c) of Definition 2 are satisfied. Second, an agent-wise local sufficient condition (i.e., distributed criterion) is provided for property a) of Definition 2 (i.e., the stability of the closed-loop system matrix) under standard assumptions.

Before describing the solvability of the problem for each distributed control law, the following definitions are presented that are used throughout this description to express the closed-loop systems in compact forms, some results related to the communication graph topology, and a key lemma about the solvability of matrix equations, which play a role on the solvability of the problem.

Define the following matrices: $\Phi \triangleq \text{diag}(\Phi_1, \ldots, \Phi_N)$, $\Phi = A, B, C, D, E$; $\Phi_m \triangleq \text{diag}(\Phi_{m1}, \ldots, \Phi_{mN})$, $\Phi_m = C_m, D_m$; $K_l \triangleq \text{diag}(K_{l1}, \ldots, K_{lN})$, $l = 1, 2$; $A_{0a} = I_N \otimes A_0$, and $R_a = I_N \otimes R$. Further let $x(t) \triangleq [x_1^T(t), \ldots, x_N^T(t)]^T \in \mathbb{R}^{\bar{n}}$, where $\bar{n} = \Sigma_{i=1}^N n_i$; $e(t) \triangleq [e_1^T(t), \ldots e_N^T(t)]^T \in \mathbb{R}^{Np}$, $e_v(t) \triangleq [e_{v1}^T(t), \ldots e_{vN}^T(t)]^T \in \mathbb{R}^{Np}$, and $\omega_a(t) \triangleq 1_N \otimes \omega(t) \in \mathbb{R}^{Nq}$.

Observing $y_i(t) - y_j(t) = e_i(t) - e_j(t)$ and recalling $d_i = \Sigma_{j \in N_i} a_{ij}$, equation (205) can be equivalently written as $$e_{vi}(t) = e_i(t) - \frac{1}{d_i + k_i} \sum_{j \in N_i} a_{ij} e_j(t). \quad (213)$$

Let $$\mathcal{F} \triangleq \text{diag}\left(\frac{1}{d_1 + k_1}, \ldots, \frac{1}{d_N + k_N}\right)$$

and $\mathcal{W} \triangleq (I_N - \mathcal{F}\mathcal{A}) \otimes I_p$. Here, in should be noted that $d_i + k_i > 0$, $\forall i \in \mathcal{N}$ by Assumption 3B; hence, $\mathcal{F}$ is well-defined. From equation (213), we have $$e_v(t) = \mathcal{W} e(t). \quad (214)$$

Similar to Lemma 3.3 in [9], the following lemma is for $I_N - \mathcal{F}\mathcal{A}$.

Lemma 1B. Under Assumption 3B, $I_N - \mathcal{F}\mathcal{A}$ is nonsingular. In addition, all its eigenvalues have positive real parts.

Proof. Under Assumption 3B, $I_N - \mathcal{A}$ satisfies conditions of the theorem in [13]. Thus, it is nonsingular. Since the singularity is eliminated, all the eigenvalues of $I_N - \mathcal{F}\mathcal{A}$ have positive real parts by the Gershgorin circle theorem (see, for example, Fact 4.10.17 in [1]).

Remark 1B. Since $I_N - \mathcal{F}\mathcal{A}$ is nonsingular under Assumption 3B, so is $\mathcal{W}$ by Proposition 7.1.7 in [1]. Then, it is clear from equation (214) that $e_i(t)$ is bounded for all $i \in \mathcal{N}$ if and only if $e_{vi}(t)$ is bounded for all $i \in \mathcal{N}$; $\lim_{t \to \infty} e_i(t) = 0$, $\forall i \in \mathcal{N}$ if and only if $\lim_{t \to \infty} e_{vi}(t) = 0$, $\forall i \in \mathcal{N}$.

Now looking at the spectral radius of $\mathcal{F}\mathcal{A}$.

Lemma 2B. Under Assumption 3B, $\rho(\mathcal{F}\mathcal{A}) < 1$.

Proof. By Lemma 1B, all the eigenvalues of $I_N - \mathcal{F}\mathcal{A}$ have positive real parts under Assumption 3B. This directly implies from the Fact 6.2.1 in [17] that the leading principal minors of $I_N - \mathcal{F}\mathcal{A}$ are all positive as $I_N - \mathcal{F}\mathcal{A}$ is a square matrix whose off-diagonal elements are all nonpositive. Since $\mathcal{F}\mathcal{A}$ is a nonnegative square matrix and the leading principal minors of $I_N - \mathcal{F}\mathcal{A}$ are all positive, $\rho(\mathcal{F}\mathcal{A}) < 1$ from Lemma 6.2.1.8 in [17].

Next, a lemma is described that extends the field of application of Lemma 1.27 in [5] to heterogeneous (in dynamics and dimension) linear time-invariant multiagent systems over general fixed directed graph communication graph topologies.

Lemma 3B. Let Assumptions 1B and 3B hold. Suppose the triple $(M_1, M_2, M_3)$ incorporates an N p-copy internal model of $A_{0a}$. If $$A_C \triangleq \begin{bmatrix} \hat{A} & \hat{B} \\ M_2 W \hat{C} + M_3 \hat{C}_m + & M_1 + M_2 W \hat{D} + M_3 \hat{D}_m \end{bmatrix}$$

is Hurwitz, where $\hat{A}$, $\hat{B}$, $\hat{C}$, $\hat{C}_m$, $\hat{D}$, and $\hat{D}_m$ are any matrices with appropriate dimensions, then the matrix equations $$XA_{0a} = \hat{A}X + \hat{B}Z + \hat{E}, \quad (215)$$

$$ZA_{0a} = M_1 Z + M_2 \mathcal{W}(\hat{C}X + \hat{D}Z + \hat{F}) + M_3(\hat{C}_m X + \hat{D}_m Z), \quad (216)$$

have unique solutions X and Z for any matrices $\hat{E}$ and $\hat{F}$ of appropriate dimensions. Furthermore, X and Z satisfy $$0 = \hat{C}X + \hat{D}Z + \hat{F}. \quad (217)$$

In other words, the conclusion is that the matrix equations $$X_c A_{0a} = A_c X_c + B_c, \quad (218)$$

$$0 = C_c X_c + D_c, \quad (219)$$

have a unique solution $X_c$, where $$X_c = \begin{bmatrix} X \\ Z \end{bmatrix}, B_c = \begin{Bmatrix} \hat{E} \\ M_2 W \hat{F} \end{Bmatrix}, C_c = [\hat{C}\hat{D}], D_c = \hat{F}.$$

Proof. Note that equations (215) and (216) (respectively, equation (217)) can be equivalently written as equation (218) (respectively, equation (219)). Note also that $\sigma(A_{0a}) = \sigma(A_0)$. Since Assumption 1B holds and $A_c$ is Hurwitz, $A_{0a}$ and $A_c$ have no eigenvalues in common. Thus, the Sylvester equation in equation (218) has a unique solution $X_c = [X^T Z^T]T$ by the first part of Proposition A.2 in [5]. In addition, we show that X and Z also satisfy equation (217). To this end, let $\bar{y} \triangleq \hat{C}X + \hat{D}Z + \hat{F}$. Since the triple $(M_1, M_2, M_3)$ incorporates an N p-copy internal model of $A_{0a}$, it has the form given by equation (201) or (202). If it takes the form equation (201), let $[\hat{\theta}^T \; \bar{\theta}^T]^T \triangleq T^{-1}Z$, where $\bar{\theta}$ has as many rows as those of $G_1$. Pre-multiplying equation (216) by $T^{-1}$ and using the foregoing definitions, $$\bar{\theta}A_{0a} = G_1\bar{\theta} + G_2 \mathcal{W} \bar{\gamma} \tag{220}$$

Note that if the triple $(M_1, M_2, M_3)$ takes the form of equation (202), equation (216) already satisfies equation (220), where $\bar{\theta} = Z$. Let $\gamma \triangleq \mathcal{W} \bar{\gamma}$; then equation (220) is in the form of (1.74) in [5]. Hence, $\gamma = 0$ by the proof of Lemma 1.27 in [5]. By Remark 1B, $\mathcal{W}$ is nonsingular under Assumption 3B. As a consequence, $\gamma = 0$ implies $\bar{\gamma} = 0$. This completes the proof of this lemma.

Dynamic State Feedback

Let $$z(t) \triangleq [z_1^T(t), \ldots, z_N^T(t)]^T \in \mathbb{R}^{\bar{n}_{z_1}},$$

wherein $\bar{n}_{z_1} = \Sigma_{i=1}^N n_{z_{1i}}$, and $G_l \triangleq \text{diag}(G_{l1}, \ldots, G_{lN})$, $l=1,2$. Inserting equation (206) into equations (203) and (204), and using the above definitions, equations (203), (207), and (204) can be compactly written as $$\dot{x}(t) = (A + BK_1)x + BK_2z + E\omega_a(t), \; x(0) = x_0, \; t \geq 0, \tag{221}$$

$$\dot{z}(t) = G_1z(t) + G_2e_v(t), \; z(0) = z_0, \; t \geq 0, \tag{222}$$

$$e(t) = (C + DK_1)x(t) + DK_2z(t) - R_a\omega_a(t). \tag{223}$$

Next, insert equation (223) into equation (214) and replace the obtained expression with the one in equation (222). Define $$x_g(t) \triangleq [x^T(t), z^T(t)]^T \in \mathbb{R}^{\bar{n} + \bar{n}_{z_1}}.$$

Then, the closed-loop system defined by equations (203), (204), (205), (206), and (207) becomes $$\dot{x}_g(t) = A_g x_g(t) + B_g \omega_a(t), \; x_g(0) = x_{g0}, \; t \geq 0 \tag{224}$$

$$e(t) = C_g x_g(t) + D_g \omega_a(t), \tag{225}$$

where $$A_g = \begin{bmatrix} A + BK_1 & BK_2 \\ G_2W(C + DK_1) & G_1 + G_2WKDK_2 \end{bmatrix}, B_g = \begin{bmatrix} E \\ -G_2WR_a \end{bmatrix},$$

$$C_g = [C + DK_1 DK_2], D_g = -R_a.$$

Theorem 1B. Let Assumptions 1B, 2B, 3B, and 6B hold. If $A_g$ is Hurwitz, then the distributed dynamic state feedback control given by equations (206) and (207) can be used in solving the problem in Definition 2.

Proof. By the definition of $A_{0a}$ minimal polynomials for $A_{0a}$ and $A_0$ are the same. Thus, the triple $(G_1, G_2, 0)$ incorporates an N p-copy internal model of $A_{0a}$ under Assumption 6B. Let $(M_1, M_2, M_3) \triangleq (G_1, G_2, 0)$. Let also $\hat{A} \triangleq A + BK_1$, $\hat{B} \triangleq BK_2$, $\hat{C} \triangleq C + DK_1$, $\hat{C}_m \triangleq 0$, $\hat{D} \triangleq DK_2$, $\hat{D}_m \triangleq 0$, $\hat{E} \triangleq E$, and $\hat{F} \triangleq -R_a$. Then, the quadruple $(A_g, B_g, C_g, D_g)$ takes the form of $(A_c, B_c, C_c, D_c)$ in Lemma 3B. In addition, $A_g$ is Hurwitz and Assumptions 1B and 3B hold. Hence, Lemma 3B is applicable and it implies that the matrix equations $$X_g A_{0a} = A_g X_g = B_g, \tag{226}$$

$$0 = C_g X_g = D_g, \tag{227}$$

have a unique solution $X_g$. Additional discussion on the solvability of equations (226) and (227) are described later in the disclosure.

Under Assumption 2B, $\|A_{0a}\omega_a(t) - \dot{\omega}_a(t)\|_2 \leq N_k$, $\forall t \geq 0$ since $\|A_{0a}\omega_a(t) - \dot{\omega}_a(t)\|_2^2 = N\|A_0\omega(t) - \dot{\omega}(t)\|_2^2$. Let $\bar{x}_g(t) - X_g \omega_a(t)$. Let $\bar{x}_g(t) - X_g \omega_a(t)$. Then, using the definition of $\bar{x}_g(t)$ and equations (226) and (227), equations (224) and (225) can be rewritten as $$\dot{\bar{x}}_g(t) = A_g \bar{x}_g(t) + X_g(A_{0a}\omega_a(t) - \dot{\omega}_a(t)), \; \bar{x}_g(0) = \bar{x}_{g0}, \; t \geq 0, \tag{228}$$

$$e(t) = C_g \bar{x}_g(t). \tag{229}$$

Now, the solution of equation (228) can be written as $$\bar{x}_g(t) = e^{A_g t}\bar{x}_{g0} + \int_0^t e^{A_g(t-\tau)} X_g(A_{0a}\omega_a(\tau) - \dot{\omega}_a(\tau))d\tau.$$

Since $A_g$ is Hurwitz, there exist $c > 0$ and $\alpha > 0$ such that $\|e^{A_g t}\|_2 \leq ce^{-\alpha t}$, $\forall t \geq 0$ (for example, see Lecture 8.3 in [3]). Owing to this bound and the bound on $\|A_{0a}\omega_a(t) - \dot{\omega}_a(t)\|_2$, the following inequality exists $$\|\bar{x}_g(t)\|_2 \leq ce^{-\alpha t}\|\bar{x}_{g0}\|_2 + \frac{c\|X_g\|2}{\alpha}\sqrt{N}\kappa, \; \forall t \geq 0.$$

Using the fact $\|e_i(t)\|_2 \leq e(t)\|_2$, $\forall i \in \mathcal{N}$ and observing $\|e(t)\|_2 \leq \|C_g\|_2\|\bar{x}_g(t)\|_2$ from equation (229), $$\|e_i(t)\|_2 \leq ce^{-\alpha t}\|C_g\|_2\|\bar{x}_{g0}\|_2 + b\zeta, \; \forall t > 0, \; \forall i \in \mathcal{N}.$$

Where $b' = c\|C_g\|_2\|X_g\|_2 N_{k\alpha}^{-1}$. For a given $\in > 0$, we have either $c\|C_g\|_2\|\bar{x}_{g0}\|_2 > \in$ or $c\|C_g\|_2\|\bar{x}_{g0}\|_2 \leq \in$. In the former case, it can be readily shown that $ce^{-\alpha t}\|C_g\|_2\|\bar{x}_{g0}\|_2 \leq \in$, $\forall t \geq T$ with $$T = \alpha^{-1} \ln\left(\frac{c\|C_g\|2\|\bar{x}_{g0}\|2}{\epsilon}\right) > 0.$$

In the latter case, the foregoing inequality may hold for all $t \geq 0$.

Thus, $e_i(t)$ may be ultimately bounded with the ultimate bound $b \triangleq b' + \in$ for all $\bar{x}_{g0}$, which is also true for all $x_{g0}$, and for all $i \in \mathcal{N}$.

If $\lim_{t \to \infty} A_0\omega(t) - \dot{\omega}(t) = 0$, then $\lim_{t \to \infty} A_0\omega_a(t) - \dot{\omega}_a(t) = 0$. Since $A_g$ is Hurwitz and the system in equations (228) is linear time-invariant when $A_{0a}\omega_a(t) - \dot{\omega}_a(t)$ is viewed as an input to the system, equation (228) is input-to-state stable with respect to this piecewise continuous input (for example, see Chapter 4.9 in [7]). Thus, $\lim_{t \to \infty} A_0\omega_a(t) - \dot{\omega}_a(t) = 0$ implies $\lim_{t \to \infty} \bar{x}_g(t) = 0$ for all $\bar{x}_{g0}$ (for example, see Exercise 4.58 in [7]). Finally, it follows from equation (229) that for all $x_{g0}$ $\lim_{t \to \infty} e_i(t) = 0$, $\forall i \in \mathcal{N}$.

Remark 2B. The ultimate bound $b$ of the tracking error for each agent can be associated with the bound $k$ in Assumption 2B. For example, as $k$ decreases (respectively, increases), $b$ decreases (respectively, increases). To elucidate the role of Assumptions 1B and 2B in practice, the following example scenarios may be considered:

a) When the piecewise continuity and boundedness of $\omega(t)$ are the only information that is available to a control designer, the triple $(0, I_p, 0)$ incorporating a p-copy internal model of $A_0 = 0$ is quite natural; hence, equation (207) can become a distributed integrator. Moreover, $X_g$ in $b$ can be explicitly expressed in terms of $A_g$ and $B_g$; that is, $X_g = -A_g^{-1}B_g$ by equation (226).

b) When the piecewise continuity and boundedness of $\omega(t)$, the boundedness of $\dot{\omega}(t)$, and some frequencies in $\omega(t)$ are available to a control designer, the triple $(G_{1i}, G_{2i}, 0)$ incorporating a p-copy internal model of $A_0$, which includes these frequencies and zero eigenvalues, is an alternative to the pure distributed integrator.

Remark 3B. As it is shown in Theorem 1B, asymptotic synchronization can be achieved when $\lim_{t\to\infty} A_0\omega(t)-\dot{\omega}(t)=0$. Next provided are sufficient conditions to check this condition can be determined as follows. If $A_0=0$ holds, $\lim_{t\to\infty}\dot{\omega}(t)=0$ can replace $\lim_{t\to\infty} A_0\omega(t)-\dot{\omega}(t)=0$; hence $\omega(t)\equiv\omega^*$ ($\omega^*$ is finite) in place of a), and $\lim_{t\to\infty}\omega(t)=\omega^*$ and $\dot{\omega}(t)$ is uniformly contouring in place of b). If one of the following conditions holds a) $\dot{\omega}(t)=A_0\omega(t)$, $\omega(0)=\omega_0$, $t\geq 0$;

b) $\lim_{t\to\infty} e^{A_0 t}\omega_0-\omega(t)=0$ and $A_0 e^{A_0 t}\omega_0-\dot{\omega}(t)$ is uniformly continuous on $[0,\infty)$, then $\lim_{t\to\infty} A_0\omega(t)-\dot{\omega}(t)=0$. Note that a) may imply b). From Barbalat's lemma given by Lemma 8.2 in [8], b) may imply that $\lim_{t\to\infty} A_0 e^{A_0 t}\omega_0-\dot{\omega}(t)=0$. Thus, $\lim^{t\to\infty} A_0\omega(t)-\dot{\omega}(t)=A_0\lim_{t\to\infty}\omega(t)-e^{A_0 t}\omega_0+\lim_{t\to\infty}A_0 e^{A_0 t}\omega_0-\dot{\omega}(t)=0$. In general, asymptotic synchronization results in the literature (for example, see [14, 4, 16]) are obtained under condition a). This disclosure covers all (or most) class of functions generated under condition a).

To obtain an agent-wise local sufficient condition that assures property a) of Definition 2 under some standard assumptions, let, $$\xi_i(t) \triangleq [x_i^T(t), z_i^T(t)]^T \in \mathbb{R}^{n_i+n_{z_{1i}}}, \mu_i(t) \triangleq \frac{1}{d_i+k_i}\sum_{j\in N_i} a_{ij}e_j(t),$$

$$\overline{A}_i \triangleq \begin{bmatrix} A_i & 0 \\ G_{2i}C_i & G_{1i} \end{bmatrix}, \overline{B}_i \triangleq \begin{bmatrix} B_i \\ G_{2i}D_i \end{bmatrix}, \overline{B}_{fi} \triangleq \begin{bmatrix} 0 \\ -G_{2i} \end{bmatrix},$$

and $\overline{C}_i \triangleq [C_i\ 0]$. Furthermore, considering equations (203), (207), (213), and (204) when $\omega(t)\equiv 0$. We now have $$\dot{\xi}_i(t)=\overline{A}_i\xi_i(t)+\overline{B}_i u_i(t)+\overline{B}_{fi}\mu_i(t),\ \xi_i(0)=\xi_{i0},\ t\geq 0, \quad (230)$$

$$e_i(t)=\overline{C}_i\xi_i(t)+D_i u_i(t). \quad (231)$$

Next, define the matrices $$A_{fi} \triangleq \begin{bmatrix} A_i+B_i K_{1i} & B_i K_{2i} \\ G_{2i}(C_i+D_i K_{1i}) & G_{1i}+G_{2i}D_i K_{2i} \end{bmatrix},$$

$$C_{fi} \triangleq [C_i+D_i K_{1i}\ D_i K_{2i}].$$

Using equations (206), (230), and (231) can be written as $$\dot{\xi}_i(t)=A_{fi}\xi_i(t)+B_{fi}\mu_i(t),\ \xi_i(0)=\xi_{i0},\ t\geq 0, \quad (232)$$

$$e_i(t)=C_{fi}\xi_i(t). \quad (233)$$

Let, in addition, $\Psi_f \triangleq \mathrm{diag}(\Psi_{f1},\ldots,\Psi_{fN})$, $\Psi=A, B, C$ and $\xi(t) \triangleq [\xi_1^T(t),\ldots,\xi_N^T(t)]^T$. Then, equations (232) and (233) can be written in the compact form given by $$\dot{\xi}(t)=A_f\xi(t)+B_f(\mathcal{F}\mathcal{A}\otimes I_p)\tilde{w}(t),\ \xi(0)=\xi_0,\ t\geq 0, \quad (234)$$

$$\tilde{z}(t)=C_f\xi(t), \quad (235)$$

where $e(t)=\tilde{w}(t)-\tilde{z}(t)$. Observe that the system in equations (234) and (235) can take the form of equation (212) in [4]. Therefore, Theorem 2 in [4] is supposed to be used immediately. However, its statement is not correct as it is written. A counterexample is described further later in the disclosure.

This paragraph uses the notation and the terminology from [4]. Readers are referred to (12), Theorem 1, and Theorem 2 in [4]. It should be noted that Theorem 2 relies on Theorem 1 and this theorem is derived by means of Theorem 11.8 and Lemma 11.2 in [19]. According to the mentioned results and Chapter 5.3, which is devoted to the notion of internal stability for the system of interest, in [19], it is clear that the following condition should be added to the hypothesis of Theorem 1: Let the realization of T(s) given by (12) be stabilizable and detectable. With this modification, not only the gap in Theorem 1, but also the one in Theorem 2 is filled.

It is understood that the system in equations (234) and (235) is stabilizable and detectable if $A_f$ is Hurwitz. Thus, the new condition is satisfied if $A_{fi}$ is Hurwitz for all $i\in\mathcal{N}$.

Remark 4B. Assumptions 4B, 5B, and 6B can ensure the stability of the pair EQN for all $i\in\mathcal{N}$. Therefore, $K_{1i}$ and $K_{2i}$ can be chosen such that $A_{fi}$ is Hurwitz for all $i\in\mathcal{N}$.

Remark 4B. Assumptions 4B, 5B, and 6B ensure the stabilizability of the pair $(\overline{A}_i, \overline{B}_i)$ for all $i\in\mathcal{N}$ by Lemma 1.25 in [5]. Therefore, $K_{1i}$ and $K_{2i}$ can always be chosen such that $A_{fi}$ is Hurwitz for all $i\in\mathcal{N}$.

Let $g_{fi}(s) \triangleq C_{fi}(sI-A_{fi})^{-1}B_{fi}$. We now state the following theorem for the dynamic state feedback case.

Theorem 2B. Let Assumption 3B hold and $A_{fi}$ be Hurwitz for all $i\in\mathcal{N}$. If $$\|g_{fi}\|_\infty \rho(\mathcal{F}\mathcal{A})<1,\ \forall i\in\mathcal{N}, \quad (236)$$

where $\|g_{fi}\|_\infty$ is the $H_\infty$ norm of $g_{fi}(s)$, then $A_g$ is Hurwitz.

Proof. It follows from Theorem 2 in [4] and the above discussion.

Remark 5B. The inequality given by equation (236) is an agent-wise local sufficient condition; that is, it paves the way for independent controller design for each agent. For the connection between this condition and an algebraic Riccati equation (respectively, linear matrix inequality), this disclosure refers to Lemma 9 in [4] (respectively, Theorem 6 in [16]). Moreover, it is understood from Lemma 2B that $\rho(\mathcal{F}\mathcal{A})<1$ under Assumption 3B. Therefore, we can restate Theorem 2B by replacing equation (236) with $\|g_{fi}\|_\infty \leq 1$, $\forall i\in\mathcal{N}$. In this statement, although the condition becomes more conservative, it is not only agent-wise local but also graph-wise local except Assumption 3. Finally, it should be noted that if the graph $\mathcal{G}$ considered in Theorem 2B contains no loop (i.e., acyclic), then the nodes in $\mathcal{G}$ can be relabeled such that $i>j$ when $(v_j, v_i)\in\mathcal{E}$. Thus, A is similar to a lower triangular matrix with zero diagonal entries, so is $\mathcal{F}\mathcal{A}$. This implies that $\rho(\mathcal{F}\mathcal{A})=0$; hence, Theorem 2B does not require the condition given by equation (236) anymore. In terms of being agent-wise and graph-wise local, this special case is consistent with the result in [18].

Dynamic Output Feedback with Local Measurement

Let $$z_i(t) \triangleq [\hat{x}_i^T(t), z_i^T(t)]^T \in \mathbb{R}^{n_{z_{2i}}},$$

where $\hat{x}_i(t)$ is the estimate of the state $x_i(t)$, $\overline{K}_i \triangleq [K_{1i}\ K_{2i}]$, and equation (209) have the form given by $$u_i(t)=K_{1i}\hat{x}_i(t)+K_{2i}\bar{e}_i(t). \quad (237)$$

To estimate the state $x_i(t)$, the following local Luenberger observer is employed $$\dot{\hat{x}}_i(t) = A_i\hat{x}_i(t) + B_i u_i(t) + H_i(y_{mi}(t) - C_{mi}\hat{x}_i(t) - D_{mi}u_i(t)),$$
$$\hat{x}_i(0) = \hat{x}_{i0},\ t \geq 0, \tag{238}$$

where $H_i$ is the observer gain matrix. Using equation (237), equation (238) can be written as $$\dot{\hat{x}}_i(t) = (A_i + B_i K_{1i} - H_i(C_{mi} + D_{mi}K_{1i}))\hat{x}_i(t) + H_i y_{mi}(t) + (B_i - H_i D_{mi})K_{2i}\bar{z}_i(t),\ \hat{x}_i(0) = \hat{x}_{i0},\ t \geq 0, \tag{239}$$

Let also $\bar{z}_i(t)$ evolve according to the dynamics given by $$\dot{\bar{z}}_i(t) = G_{1i}\bar{z}_i(t) + G_{2i}e_{vi}(t),\ \bar{z}_i(0) = \bar{z}_{i0},\ t \geq 0, \tag{240}$$

By equations (239) and (240), one can define the triple ($M_{1i}$, $M_{2i}$, $M_{3i}$) in equation (210) as $$M_{1i} \triangleq \begin{bmatrix} A_i + B_i K_{1i} - H_i(C_{mi} + D_{mi}K_{1i}) & (B_i - H_i D_{mi})K_{2i} \\ 0 & G_{1i} \end{bmatrix}$$

$$M_{2i} \triangleq \begin{bmatrix} 0 \\ G_{2i} \end{bmatrix},\ M_{3i} \triangleq \begin{bmatrix} H_i \\ 0 \end{bmatrix}. \tag{241}$$

Using equation (208), equation (239) can be rewritten as $$\dot{\hat{x}}_i(t) = H_i C_{mi} x_i(t) + (A_i + B_i K_{1i} - H_i C_{mi})\hat{x}_i(t) + B_i K_{2i}\bar{z}_i(t),$$
$$\hat{x}_i(0) = x_{i0},\ t \geq 0, \tag{242}$$

Next, define $\hat{x}(t) \triangleq [\hat{x}_1^T(t), \ldots, \hat{x}_N^T(t)]^T \in \mathbb{R}^{\bar{n}}$, $\bar{z}(t) \triangleq [\bar{z}_1^T(t), \ldots, \bar{z}_N^T(t)]^T$ and $H \triangleq \text{diag}(H_1, \ldots, H_N)$. Inserting equation (237) into equations (203) and (204), using equation (242), equation (240), and the above definitions, equations (3), (10), and (4) can be compactly written as $$\dot{x}(t) = Ax(t) + BK_1\hat{x}(t) + BK_2\bar{z}(t) + E\omega_a(t),\ x(0) = x_0,\ t \geq 0, \tag{243}$$

$$\dot{\hat{x}}(t) = HC_m x(t) + (A + BK_1 - HC_m)\hat{x}(t) + BK_2\bar{z}(t),\ \hat{x}(0) = x_0,\ t \geq 0, \tag{244}$$

$$\dot{\bar{z}}(t) = G_1\bar{z}(t) + G_2 e_v(t),\ \bar{z}(0) = \bar{z}_0,\ t \geq 0, \tag{245}$$

$$e(t) = Cx(t) + DK_1\hat{x}(t) + DK_2\bar{z}(t) - R_a\omega_a(t). \tag{246}$$

Now, insert equation (246) into equation (214) and replace the obtained expression with the one in equation (245). Let $$\eta(t) \triangleq [x^T(t), \hat{x}^T(t), \bar{z}^T(t)]^T \in \mathbb{R}^{\bar{n}+\bar{n}_{z_2}},$$

where $\bar{n}_{z_2} = \Sigma_{i=1}^N n_{z_{2i}}$. Then, the closed-loop system of equations (203), (204), (205), (208), (209), and (210) can be represented as $$\eta(t) = A_\eta \eta(t) + B_\eta \omega_a(t),\ \eta(0) = \eta_0,\ t \geq 0, \tag{247}$$

$$e(t) = C_\eta \eta(t) + D_\eta \omega_a(t) \tag{248}$$

where $$A_\eta = \begin{bmatrix} A & BK_1 & BK_2 \\ HC_m & A + BK_1 - HC_m & BK_2 \\ G_2 WC & G_2 WDK_1 & G_1 + G_2 WDK_2 \end{bmatrix},$$

$$B_\eta = \begin{bmatrix} E \\ 0 \\ -G_2 WR_a \end{bmatrix},\ C_\eta = [C\ DK_1\ DK_2],\ D_\eta = -R_a.$$

For the following result, define $A_{Hi} \triangleq A_i - H_i C_{mi}$ and $A_H \triangleq A - HC_m$. By Assumption 7B, $H_i$ can be chosen such that $A_{Hi}$ is Hurwitz for all $i \in \mathcal{N}$.

Theorem 3B. Let Assumptions 1B, 2B, 3B, and 6B hold. If $A_g$ is Hurwitz and $A_{Hi}$ is Hurwitz for all $i \in \mathcal{N}$, then the distributed dynamic output feedback control with local measurement given by equations (209) and (210) can solve the problem in Definition 2.

Proof. Let $K \triangleq [K_1\ K_2]$, $\hat{A} \triangleq A$, $\hat{B} \triangleq BK$, $\hat{C} \triangleq C$, $\hat{C}_m \triangleq C_m$, $\hat{D} \triangleq DK$, $\hat{D}_m \triangleq D_m K$, $\hat{E} \triangleq E$, $\hat{F} \triangleq -R_a$, $$M_1 \triangleq \begin{bmatrix} A + BK_1 - H(C_m + D_m K_1) & (B - HD_m)K_2 \\ 0 & G_1 \end{bmatrix},$$

$$M_2 \triangleq \begin{bmatrix} 0 \\ G_2 \end{bmatrix},\ M_3 \triangleq \begin{bmatrix} H \\ 0 \end{bmatrix}. \tag{249}$$

Then, observe that the quadruple $(A_\eta, B_\eta, C_\eta, D_\eta)$ takes the form of $(A_c, B_c, C_c, D_c)$ in Lemma 3B. Recall from the proof of Theorem 1B that the triple $(G_1, G_2, 0)$ incorporates an N p-copy internal model of $A_{0a}$ under Assumption 6B. Thus, the triple $(M_1, M_2, M_3)$ may also incorporate an N p-copy internal model of $A_{0a}$. It is given that Assumptions 1B and 3B hold. In order to apply Lemma 3B, it should be shown that $A_\eta$ is Hurwitz under the conditions that $A_g$ is Hurwitz and $A_{Hi}$ is Hurwitz for all $i \in \mathcal{N}$. To this end, the following elementary row and column operations are performed on $A_\eta$. First, subtract row 1 from row 2 and add column 2 to column 1. Second, interchange rows 2 and 3, and interchange columns 2 and 3. Thus, we obtain the matrix given by $$\bar{A}_\eta \triangleq \begin{bmatrix} A + BK_1 & BK_2 & BK_1 \\ G_2 W(C + DK_1) & G_1 + G_2 WDK_2 & G_2 WDK_2 \\ 0 & 0 & A_H \end{bmatrix}.$$

Considering the performed elementary row and column operations, one can verify that $A_\eta$ is similar to $\bar{A}_\eta$; hence, they have the same eigenvalues. Since $\bar{A}_\eta$ is upper block triangular, $\sigma(\bar{A}_\eta) = \sigma(A_g) \cup \sigma(A_H)$. Note that $A_H$ is Hurwitz as $A_{Hi}$ is Hurwitz for all $i \in \mathcal{N}$. It is also given that $A_g$ is Hurwitz. Thus, $A_\eta$ is Hurwitz. Then, the matrix equations $$X_\eta A_{0a} = A_\eta X_\eta + B_\eta,$$

$$0 = C_\eta X_\eta + D_\eta,$$

have a unique solution $X_\eta$ by Lemma 3B.

Following similar steps to those in the proof of Theorem 1B, it can be shown under Assumption 2B that $e_i(t)$ is ultimately bounded with an ultimate bound for all $\eta_0$ and for all $i \in \mathcal{N}$. If, in addition, $\lim_{t \to \infty} A_0 \omega(t) - \dot{\omega}(t) = 0$ then for all $\eta_0$ $\lim_{t \to \infty} e_i(t) = 0$, $\forall i \in \mathcal{N}$.

Since the condition on $A_{Hi}$ is both agent-wise and graph-wise local, an agent-wise local sufficient condition that ensures property a) of Definition 2 can be determined by determining an agent-wise local sufficient condition, under standard assumptions, for the stability of $A_g$, which is already given in Theorem 2B.

Dynamic Output Feedback

Define $z_i(t)$, $\bar{K}_i$, and $u_i(t)$ as previously described herein; that is, equation (211) has the form of equation (237). Since $e_{vi}(t)$ is the only available information to each agent, the following distributed observer is considered instead of equation (239) to estimate the state $x_i(t)$ $$\dot{\hat{x}}_i(t)=(A_i+B_iK_{1i}-L_i(C_i+D_iK_{1i}))\hat{x}_i+L_ie_{vi}(t)+(B_i-L_iD_i)K_{2i}$$
$$\bar{z}_i(t), \hat{x}_i(0)=x_{i0}, t\geq 0, \quad (250)$$

where $L_i$ is the observer gain matrix. Let $\bar{z}_i(t)$ satisfy the dynamics in equation (240). Define the pair $(M_{1i}, M_{2i})$ in equation (212) by replacing the triple $(H_i, C_{mi}, D_{mi})$ in $M_{1i}$ (respectively, the zero matrix in $M_{2i}$) given by equation (241) with $(L_i, C_i, D_i)$ (respectively, $L_i$).

Define $\hat{x}(t)$ and $\hat{x}(t)$ as described previously herein and $L \triangleq \text{diag}(L_1, \ldots, L_N)$. Inserting equation (237) into equations (203) and (204), using equation (250), equation (240), and the above definitions, equations (203), (212), and (204) can be expressed by equation (243), $$\dot{\hat{x}}_i(t)=(A+BK_1-L(C+DK_1))\hat{x}(t)+(B-LD)K_2\bar{z}(t)+$$
$$Le_v(t), \hat{x}(0)=\hat{x}_0, t\geq 0, \quad (251)$$

equation (245), and equation (246). Next, insert equation (246) into equation (214) and replace the obtained expression not only with the one in equation (245) but also with the one in equation (251). In addition, define $\eta(t)$ as described previously herein. Then, the closed-loop system of equations (203), (204), (205), (211), and (212) can be expressed by equations (247) and (248) if the second row of $A_\eta$ is replaced with $$[L\,\mathcal{W}\,CA+BK_1-L(C+DK_1-\mathcal{W}\,DK_1)(B-LD+L$$
$$\mathcal{W}\,D)K_2]$$

and the second row of $B_\eta$ is replace with $-L\,\mathcal{W}\,R_a$.

Theorem 4B. Let Assumptions 1B, 2B, 3B, and 6B hold. If the resulting $A_\eta$ is Hurwitz, then the distributed dynamic output feedback control given by equations (211) and (212) solves the problem in Definition 2.

Proof. Define $K$, $\hat{A}$, $\hat{B}$, $\hat{C}$, $\hat{D}$, $\hat{E}$, and $\hat{F}$, as in the proof of Theorem 3B. Let $\hat{C}_m \triangleq 0$, $\hat{D}_m \triangleq 0$, and $M_3 \triangleq 0$. Define also the pair $(M_1, M_2)$ by replacing the triple $(H, C_m, D_m)$ in $M_1$ (respectively, the zero matrix in $M_2$) given by equation (249) with $(L, C, D)$ (respectively, $L$). Then, observe that the resulting quadruple $(A_\eta, B_\eta, C_\eta, D_\eta)$ takes the form of $(A_c, B_c, C_c, D_c)$ in Lemma 3B. By the same argument in the proof of Theorem 3B, the resulting triple $(M_1, M_2, M_3)$ incorporates an N p-copy internal model of $A_{0a}$ under Assumption 6B. Since, in addition, Assumptions 1B, 2B, and 3B hold and $A_\eta$ is Hurwitz, the rest of the proof can be completed by following the steps given in the proof of Theorem 1B.

Now, a goal can be to determine an agent-wise local sufficient condition that assures property a) of Definition 2 under some standard assumptions. For this purpose, define $\mu_i(t)$ as in as described previously herein and let $\zeta_i(t) \triangleq [x_i^T(t), \hat{x}_i^T(t), \bar{z}_i^T(t)]^T$, $$A_{fi} \triangleq \begin{bmatrix} A_i & B_iK_{1i} & B_iK_{1i} \\ L_iC_i & A_i+B_iK_{1i}-L_iC_i & B_iK_{1i} \\ G_{2i}C_i & G_{2i}C_iK_{1i} & G_{1i}+G_{2i}D_iK_{2i} \end{bmatrix},$$

$$B_{Fi} \triangleq \begin{bmatrix} 0 \\ -L_i \\ -G_{2i} \end{bmatrix}, C_{Fi} \triangleq [C_i D_iK_{1i} D_iK_{2i}].$$

Furthermore, consider equations (203), (212), (213), and (204) when $\omega(t)\equiv 0$. By inserting equation (211) into the considered equations, we have $$\dot{\zeta}_i(t)=A_{Fi}\zeta_i(t)+B_{Fi}\mu_i(t), \zeta_i(0)=\zeta_{i0}, t\geq 0, \quad (252)$$

$$e_i(t)=C_{Fi}\zeta_i(t). \quad (253)$$

Remark 6B. Let $A_{Li} \triangleq A_i - L_iC_i$. By performing the elementary row and column operations given in the proof of Theorem 3B on $A_{Fi}$, it can be shown that $\sigma(A_{Fi})=\sigma(A_{fi})\cup\sigma(A_{Li})$. Note that by Assumption 8B, $L_i$ can be chosen such that $A_{Li}$ is Hurwitz for all $i\in\mathcal{N}$. In conjunction with Remark 4B, this shows that under Assumptions 4B, 5B, 6B, and 8B, it is possible to find $K_{1i}$, $K_{2i}$, and $L_i$ such that $A_{Fi}$ is Hurwitz for all $i\in\mathcal{N}$.

Let $g_{Fi}(s) \triangleq C_{Fi}(sI-A_{Fi})^{-1}B_{Fi}$. For the dynamic output feedback case, the following theorem can be described.

Theorem 5B. Let Assumption 3B hold and $A_{Fi}$ be Hurwitz for all $i\in\mathcal{N}$. If $$\|g_{Fi}\|_\infty \rho(\mathcal{F}\mathcal{A})<1, \forall i\in\mathcal{N}. \quad (254)$$

then the resulting $A_\eta$ is Hurwitz.

Proof. It follows by comparing equations (252) and (253) with equations (232) and (233).

To illustrate the performance of the proposed distributed controller architecture described in this embodiment, the following two numerical examples with different exosystems are presented. In particular, the first (respectively, second) example presents the distributed dynamic state (respectively, output) feedback control law. For both examples, we consider five agents with the following system, input, output, and direct feedthrough matrices $$A_i=\begin{bmatrix} -1 & 1 \\ 0.2 & 0 \end{bmatrix}, B_i=\begin{bmatrix} 1 \\ 2 \end{bmatrix}, C_i=[1\ 0], D_i=0.1, i=1,4,5,$$

$$A_i=\begin{bmatrix} 0 & 1 & 0 \\ 0 & 2 & 1 \\ 0 & 0 & 0 \end{bmatrix}, B_i=\begin{bmatrix} 0 & 0 \\ 1 & 0 \\ 0 & 1 \end{bmatrix}, C_i=[1\ 0\ 0.4], D_i=0, i=2,3,$$

and the augmented graph $\mathcal{G}$ shown in FIG. 1. With this setup, each agent satisfies Assumptions 4B and 8B. It is also clear from FIG. 1 that Assumption 3B holds. In the simulations, each nonzero $a_{ij}$ is set to 1 and $k_i=1$, $i=1,2$. Moreover, initial conditions for the agents are given by $x_{10}=[1, 0.6]^T$, $x_{20}=[-0.5, 0, -0.2]^T$, $x_{30}=[-0.2, -0.3, 0]^T$, $x_{40}=[0.6, 0]^T$, $x_{50}=[0, 0.5]^T$, and the controllers of all agents are initialized at zero.

Example 3. In this example, the disturbance $\delta(t)$ and the trajectory of the leader $r_0(t)$ satisfy the following dynamics $$\dot{\delta}(t)=\begin{bmatrix} 0 & 0.01 & 0 \\ 0 & 0 & 0 \\ 0 & 0 & -0.05 \end{bmatrix}\delta(t)+\begin{bmatrix} 0 \\ 0 \\ 0.05 \end{bmatrix}, \delta(0)=\begin{bmatrix} 0 \\ -0.2 \\ 0 \end{bmatrix}, t\geq 0,$$

$$\dot{r}_0(t)=-t_0^3(t)+u_0(t), r_0(0), t\geq 0,$$

respectively, where $$u_0(t)=\begin{cases} 0.1t, & 0\leq t<100, \\ 0.1t-2\sin(0.1t)e^{-0.01(t-100)}, & 100\leq t<200, \\ 14+\sin(0.05(t-200)), & t\geq 200. \end{cases}$$

By the solution of the disturbance dynamics with the given initial condition, $\delta(t)$ is bounded. Since $u_0(t)$ is piecewise continuous and bounded, $r_0(t)$ is bounded by Example 4.25 in [7]; hence, $\dot{r}_0(t)$ is piecewise continuous and bounded. Clearly, $\dot{\omega}(t)$ is piecewise continuous and bounded. Furthermore, the exosystem affects the state of each agent and its tracking error through matrices $$E_{\delta_1} = \begin{bmatrix} 0 & 1 & 0 \\ 0 & 0 & 0 \end{bmatrix},$$

$$E_{\delta_4} = \begin{bmatrix} 0.1 & 0 & 0 \\ 0 & 0 & -0.1 \end{bmatrix},$$

$$E_{\delta_5} = \begin{bmatrix} 0 & 0 & 0 \\ -0.1 & -0.2 & 0 \end{bmatrix},$$

$$E_{\delta_2} = \begin{bmatrix} 0 & 0 & 1 \\ 0 & 0 & 0 \\ 0 & 0 & 0.5 \end{bmatrix},$$

$$E_{\delta_3} = \begin{bmatrix} 0 & -0.5 & 0 \\ 0 & 0 & -1 \\ 0 & 0.4 & 0 \end{bmatrix}, R_r = 1$$

Suppose the piecewise continuity and boundedness of $\dot{\omega}(t)$ are the only information that is known about the exosystem. As it is suggested in part a) of Remark 2B, let $A_0=0$ and $(G_{1i}, G_{2i})=(0,1)$ for all $i \in \mathcal{N}$. Thus, Assumptions 1B, 2B, 5B, and 6B hold. With the following controller parameters $$K_{1i} = -[1.1960 \; 0.9611], K_{2i} = -1.4142, i=1,4,5,$$

$$K_{1i} = -\begin{bmatrix} 4.2328 & 5.3904 & 1.4038 \\ 1.2604 & 1.4038 & 1.7115 \end{bmatrix},$$

$$K_{2i} = -\begin{bmatrix} 1.2788 \\ 1.3655 \end{bmatrix}, i=2,3,$$

Figure 4:
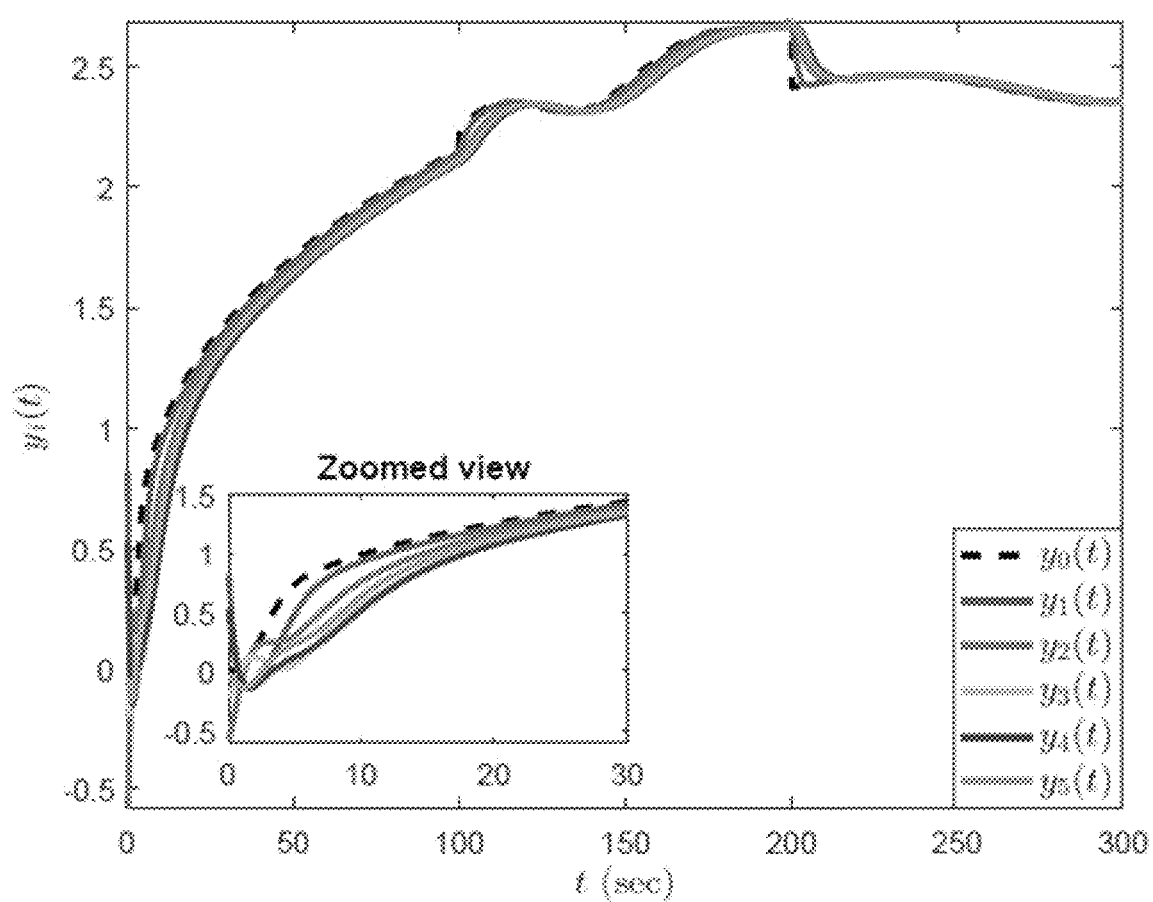
FIG. 4 is a graph that represents an example output response of a multi-agent system with dynamic state feedback, in accordance with the second embodiment.

$A_{fi}$ is Hurwitz for all $i \in \mathcal{N}$ and the condition given by equation (236) is satisfied. Thus, $A_g$ is Hurwitz by Theorem 2B. As Theorem 1B promises, ultimately bounded tracking error is observed in FIG. 4.

Example 2. The disturbance and the trajectory of the leader satisfy $$\dot{\delta}(t) = e^{-0.1t}, \delta(0)=1, t \geq 0$$

$$\dot{r}_0(t) = \begin{bmatrix} 0 & 0.5 \\ -0.5 & 0 \end{bmatrix} r_0(t) + \begin{bmatrix} te^{-t}\sin(t) \\ 2e^{-t} \end{bmatrix},$$

$$r_0(0) = \begin{bmatrix} -1 \\ 1 \end{bmatrix}, t \geq 0,$$

respectively. Moreover, $E_{\delta_1}=[1\;0]^T$, $E_{\delta_2}=[0\;1\;0]^T$, $E_{\delta_3}=[-1.5\;0\;0.3]^T$, $E_{\delta_4}=[0\;2]^T$, $E_{\delta_5}=[0.2\;-0.2]^T$, and $R_r=[1\;0]$.

Suppose the unforced parts of the given dynamics are available to the control designer and the forcing terms are known to be piecewise continuous and convergent to zero. Then, let $$A_0 = \begin{bmatrix} 0 & 0.5 & 0 \\ -0.5 & 0 & 0 \\ 0 & 0 & 0 \end{bmatrix},$$

and $$G_{1i} = \begin{bmatrix} 0 & 1 & 0 \\ 0 & 0 & 1 \\ 0 & -0.25 & 0 \end{bmatrix},$$

$$G_{2i} = \begin{bmatrix} 0 \\ 0 \\ 1 \end{bmatrix}, \forall i \in \mathcal{N}.$$

Hence, Assumptions 1B, 5B, and 6B hold. In addition, $\lim_{t \to \infty} A_0 \omega(t) - \dot{\omega}(t) = 0$. Note that Assumption 2B automatically holds since $A_0 \omega(t) - \dot{\omega}(t)$ is piecewise continuous and convergent. With the following controller parameters $$K_{1i} = -[5.1794 \; 0.7932], L_i = [17 \; 80.2]^T,$$

$$K_{2i} = -[2 \; 5.4458 \; 10.3182], i=1,4,5,$$

$$K_{1i} = -\begin{bmatrix} 6.1916 & 5.7686 & 1.7835 \\ 3.9299 & 1.7835 & 2.4282 \end{bmatrix},$$

$$L_i [-187 \; 756 \; 600]^T,$$

$$K_{2i} = -\begin{bmatrix} 0.4513 & 0.9173 & 3.3839 \\ 0.8924 & 2.2285 & 5.6377 \end{bmatrix},$$

Figure 5:
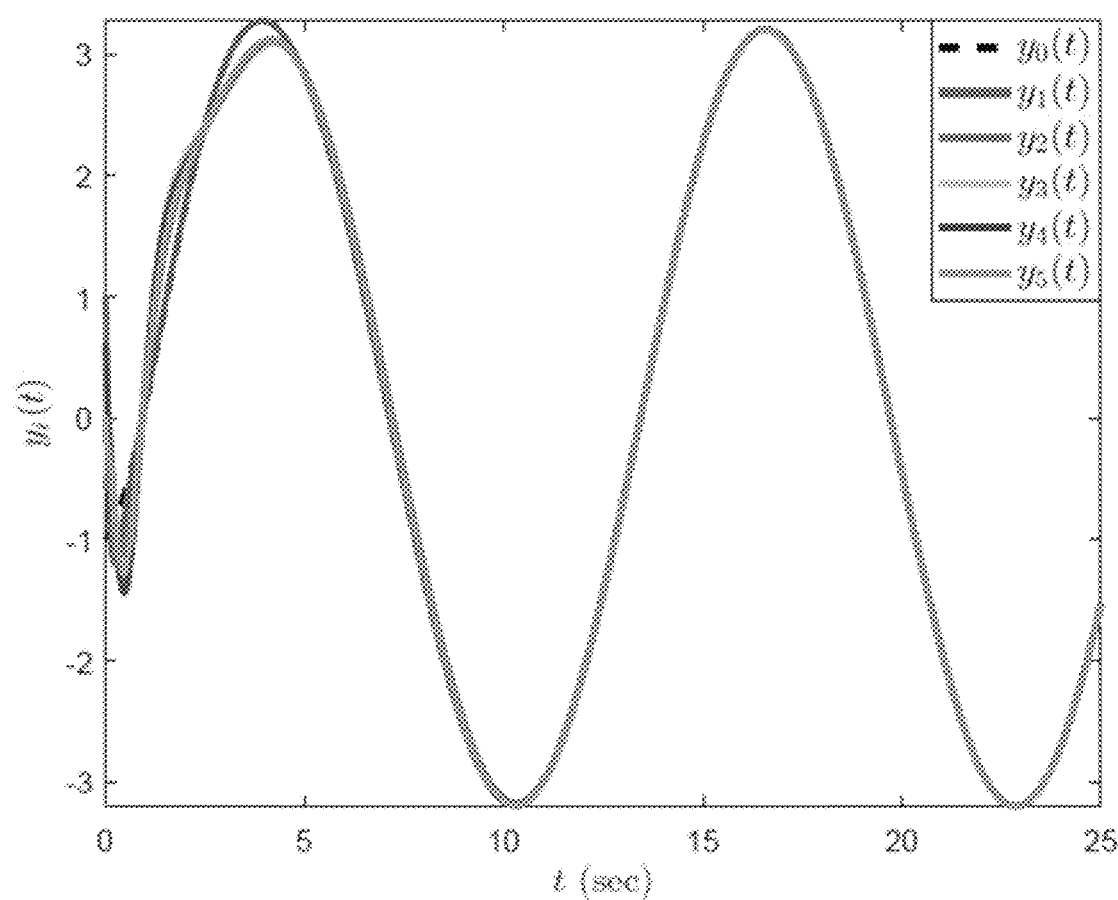
FIG. 5 is a graph that represents an example output response of a multi-agent system with dynamic output feedback, in accordance with the second embodiment.

$A_{Fi}$ is Hurwitz for all $i \in \mathcal{N}$ and the condition given by equation (254) is satisfied. Thus, $A_\eta$ is Hurwitz by Theorem 5B. Furthermore, it is guaranteed by Theorem 4B that $\lim_{t \to \infty} e_i(t)=0, \forall i \in \mathcal{N}$ and this fact is demonstrated in FIG. 5.

Solvability of Equations (226) and (227)

Section III in [4] also studies the solvability of the matrix equations in equations (226) and (227), which correspond to the matrix equations given by (6) in [4], with an alternative approach. Specifically, the last paragraph of Section III in [4] lists three sufficient conditions based on Remark 3.8 of [6] to guarantee that these matrix equations have a unique solution. However, it cannot be guaranteed as it claimed in [4]. This subsection aims to present the gaps between the conditions and the existence of a unique solution to the matrix equations, propose appropriate modifications that fill these gaps, and explain the motivation behind the disclosed approach. For this purpose, the first focus is on Definition 3.7 and Remark 3.8 in [6] to fix a problem in [6]. Then, the conditions listed in [4] are revisited to point out the missing one. Finally, a motivational example is provided and the difference between the approach in [4] and the one in this disclosure is highlighted.

In this paragraph, the notation and the terminology in [6] are adopted and readers are referred to (3.5), (3.6), (3.8), Definition 3.7, and Remark 3.8 in [6]. The problem in [6] is that the conditions of Remark 3.8 do not ensure the stabilizability of the pair given by (3.8). Moreover, this problem is directly transferred to [4]. To illustrate this point, the following system, input, output, and direct feedthrough matrices of the plant; and system matrix of the exosystem are considered $$A = \begin{bmatrix} 1 & 2 \\ 1 & 0 \end{bmatrix},$$

$$B = \begin{bmatrix} 2 \\ 0 \end{bmatrix},$$

$C=[0.5\ -0.5]$, $D=0$, $A_1=0$.

It can be easily checked that the plant and the exosystem above satisfy the first and the second condition of Remark 3.8. Note that m(s)=s is the minimal polynomial of $A_1$. Then, choose the pair $(\beta_1, \sigma_1)$ in (3.6) as follows $$\beta_1 = \begin{bmatrix} 0 & 1 \\ 0 & 1 \end{bmatrix},$$

$$\sigma_1 = \begin{bmatrix} 0 \\ 1 \end{bmatrix}.$$

It is obvious that the pair $(\beta_1, \sigma_1)$ is controllable and the minimal polynomial of $A_1$ divides the characteristic polynomial of $\beta_1$. Thus, the pair $(G_1, G_2) \triangleq (\beta_1, \sigma_1)$ incorporates a 1-copy internal model of $A_1$ according to Definition 3.7. Now investigated the stabilizability of the pair in equation (3.8). This pair is not controllable by the controllability matrix test (for example, see Theorem 12.1 in [3]) and the eigenvalues of the first matrix of this pair are −1, 0, 1, and 2. The eigenvector test for stabilizability (for example, see Theorem 14.1 in [3]) reveals that unstable eigenvalue 1 is the uncontrollable mode; that is, the pair in (3.8) is not stabilizable. Hence, there do not exist $K_1$ and $K_2$ such that $A_c$ defined in (3.5) is Hurwitz. This counterexample to Remark 3.8 is obtained due to the fact that the constructed $G_1$ violates Property 1.5 in [5]. In fact, J. Huang (personal communications, Jun. 9, 2018) recognizes the problem in Remark 3.8; hence, he adds Property 1.5 as a condition to Lemma 1.27 of [5]. Also noted is that the proof of Lemma 1.26 in [5] is still valid even if Assumption 1.1 in [5] is removed from the hypotheses of Lemma 1.26.

In this disclosure, Definition 1 modifies the second property of Definition 1.22 given after (1.58) in [5]. This modification guarantees that Property 1.5 in [5] automatically holds if Assumption 5B holds. Based on the foregoing discussions, it is clear that Remark 4B is true.

The following two paragraphs adopt the notation and the terminology from [4]. Readers are referred to (5), (6), (7), (8), (10), Definition 2, Lemma 2, Section IIB, and Section III in [4]. It is shown in Section III that if the matrix equations in (8) have solutions $X_{1i}$ and $X_{2i}$ for i=1, ..., N, then the ones in (7) have solutions $X_1=\text{diag}(X_{11}, \ldots, X_{1N})$ and $X_2=\text{diag}(X_{21}, \ldots, X_{2N})$; that is, the matrix equations in (6) has a solution $X=[X_1^T X_2^T]^T$. Furthermore, it is claimed that if the three conditions listed in the last paragraph of Section III hold, then the matrix equations in (8) have unique solutions $X_{1i}$ and $X_{2i}$ for i=1, ..., N. In section II.B, S is assumed to have no strictly stable modes. However, these conditions do not guarantee the unique solutions. For, consider $A_1=0$, $B_1=1$, $C_1=1$, $D_1=0$, $S=0$, $R=1$, $P_1=1$, $F_1=0$, and $G_1=1$. It can be easily checked that the listed conditions are satisfied and Property 1.5 in [5] is not violated. Choose $K_1=0$ and $H_1=0$. From the first matrix equation in (8), we get 1=0, which is a contradiction. Next, the problem in the claim is pointed out. First, observe that the matrix equations in (8) can be equivalently written as the matrix equations given by (1.70) and (1.71) in [5]. Then, Lemma 1.27 in [5], one can note that the following condition is missed in the claim: $\tilde{A}_i$ given after (10) is Hurwitz for i=1, ..., N. After the suggested modification above, $K_i$ and $H_i$ can always be chosen such that $\tilde{A}_i$ is Hurwitz under the listed conditions. It can be shown that this condition, together with the assumption on S, ensures that zero matrices are the unique solutions to the off-block-diagonal matrix equations in (7) by adding $G_c((C_c=D_cK_c)X_1+D_cH_cX_2-R_c)$ to the left side of the second equation in (7) that gives an equivalent form of (7) and applying the first part of Proposition A.2 in [5]. In conclusion, if the assumption on S holds, the third condition in the list holds for i=1, ..., N, and $\tilde{A}_i$ is Hurwitz for i=1, ..., N, then the matrix equations in (6) has a unique solution X.

According to Lemma 2B, the problem in Definition 2 is solved if the assumption on S holds, $A_i$ given after (5) is Hurwitz, and the matrix equations in (6) have a unique solution X. Although the approach utilized during the derivation of the listed conditions does not take into account the assumption on $A_i$, which is required to solve the problem in Definition 2, one may wonder the answer of the following question: Let the listed conditions hold and $A_i$ be Hurwitz. Then, can it be concluded that $\tilde{A}_i$ is Hurwitz for i=1, ..., N? The answer is no. That is, the missing condition cannot be satisfied by assuming that the listed conditions hold and $A_i$ is Hurwitz. To clarify this point, consider the system parameters of the agents, the system matrix of the exosystem, and the adjacency matrix of $\mathcal{G}$ *.

$$A_1 = \begin{bmatrix} -1 & 1 \\ 1 & 0 \end{bmatrix},$$

$$B_1 = \begin{bmatrix} 1 & 0.5 \\ 0 & 0.25 \end{bmatrix},$$

$C_1 = [1\ -0.5]$, $D_1 = 0$, $$A_2 = \begin{bmatrix} 0 & 1 & 0 \\ 0 & 0 & 1 \\ 0 & 0 & 0 \end{bmatrix},$$

$$B_2 = \begin{bmatrix} 0 \\ 0 \\ 1 \end{bmatrix},$$

$C_2 = [1\ 0\ 0]$, $D_2 = 0$, $A_3=1$, $B_3=-1$, $C_3=1$, $D_3=0$, $S=0$, $$\mathcal{Q}^* = \begin{bmatrix} 1 & 0 & 0 & 0 \\ 0.5 & 0 & 0 & 0.5 \\ 0 & 0.5 & 0 & 0.5 \\ 0 & 0.5 & 0.5 & 0 \end{bmatrix}.$$

Choose $(F_i, G_i)=(0,1)$, i=1,2,3. It can be easily checked that the listed conditions are satisfied and Property 1.5 in [5] is not violated. One can also obtain W, which is required to construct $A_i$, from $\mathcal{Q}$ *. Then, choose the remaining parameters of the controllers as follows $$K_1 = \begin{bmatrix} 2.6752 & 9.6624 \\ -10.6752 & -24.6624 \end{bmatrix},$$

$$H_1 = \begin{bmatrix} -6.4 \\ 6.4 \end{bmatrix},$$

$K_2 = -[104.56\ 57.936\ 14.828]$, $H_2 = -80$, $K_3 = 0.8$, $H_3 = 1$.

With this setup, it can be verified that 3 is not Hurwitz even though A is Hurwitz.

Based on the previous example, the following question arises: Is the missing condition in [4] necessary to ensure that the matrix equations given by (6) in [4] have a unique solution? In fact, this question is the motivation behind the key lemma (i.e., Lemma 3B) of this disclosure and the answer is no. In contrast to Section III in [4], the approach in Lemma 3B does not decompose matrix equations, which consist of the overall dynamics of the multiagent system, into matrix equations, which deal with the dynamics of each agent separately; hence, the missing condition in [4] is not required in Lemma 3B. Furthermore, not only dynamic stated feedback but also dynamic output feedback with local measurement and dynamic output feedback effectively utilize Lemma 3B to solve the stated problem in Definition 2 (see Theorems 1B, 3B, and 4B).

Since the proof of Theorem 1 and the statement of Theorem 4 in [16] use the approach in Section III of [4], the description in this subsection will also be helpful for the readers of the results in [16].

On Theorem 2 in [2]

In this subsection, the notion and the terminology in [4] are adopted and readers are referred to (5), (10), (15), and Theorem 2 in [4]. Now, consider the system parameters of the agent, the system matrix of the exosystem, and the adjacency matrix of $\mathcal{G}^*$ given by $$A_1 = \begin{bmatrix} 1 & 0 & 0 \\ 0 & 1 & 0 \\ 0 & 0 & -1 \end{bmatrix},$$

$B_1 = I_3$, $$C_1 = \begin{bmatrix} 1 & 0 & 0 \\ 0 & 1 & 0 \end{bmatrix},$$

$D_1 = 0$, $S = 0$, $$Q^* = \begin{bmatrix} 1 & 0 \\ 1 & 0 \end{bmatrix}.$$

Choose $(F_1, G_1) = (0, I_2)$ and $$K_1 = \begin{bmatrix} -2 & 0 & 0 \\ 0 & -2 & 0 \\ 0 & 0 & 2 \end{bmatrix},$$

$$H_1 = \begin{bmatrix} -1 & 0 \\ 0 & -1 \\ 0 & 0 \end{bmatrix}.$$

Note that $W = 1$ from $\mathcal{Q}^*$; hence, $A_l$ given after (5) is nothing but $\tilde{A}_1$ given after (10). With this setup, it can be verified that $T_1(s)$ given before Theorem 2 is stable and the condition in (15) is automatically satisfied, but $A_l$ is not Hurwitz. This counterexample is obtained because the realization of $T_1(s)$ is neither stabilizable nor detectable.

The above setup also applies to Theorem 5 in [16] since it relies on Theorem 2 and its conditions are satisfied. It should be noted that although Assumptions 1-4 in [16] and Property 1.5 in [5] are not listed in the hypothesis of Theorem 5 in [16], this counterexample does not violate them.

References Related to the Second Embodiment

[1] D. S. Bernstein. *Matrix mathematics: Theory, facts, and formulas.* Princeton University Press, 2009.

[2] H. Cai, F. L. Lewis, G. Hu, and J. Huang. The adaptive distributed observer approach to the cooperative output regulation of linear multi-agent systems. *Automatica,* 75:299-305, 2017.

[3] J. P. Hespanha. *Linear systems theory.* Princeton University Press, 2009.

[4] C. Huang and X. Ye. Cooperative output regulation of heterogeneous multi-agent systems: An H1 criterion. *IEEE Transactions on Automatic Control,* 59(1):267-273, 2014.

[5] J. Huang. *Nonlinear output regulation: Theory and applications.* SIAM, 2004.

[6] J. Huang and C.-F. Lin. On a robust nonlinear servomechanism problem. *IEEE Transactions on Automatic Control,* 39(7):1510-1513, 1994.

[7] H. K. Khalil. *Nonlinear systems.* Prentice Hall, 2002.

[8] E. Lavretsky and K. A. Wise. *Robust and adaptive control with aerospace applications.* Springer, 2013.

[9] F. L. Lewis, H. Zhang, K. Hengster-Movric, and A. Das. *Cooperative control of multi-agent systems: Optimal and adaptive design approaches.* Springer, 2014.

[10] Li, X. Wang, J. Xiang, and W. Wei. Synchronised output regulation of leader-following heterogeneous networked systems via error feedback. *International Journal of Systems Science,* 47(4), 2015.

[11] S. B. Sarsilmaz and T. Yucelen. On control of heterogeneous multiagent systems with unknown leader dynamics. In *ASME Dynamic Systems and Control Conference,* 2017.

[12] S. B. Sarsilmaz and T. Yucelen. On control of heterogeneous multiagent systems: A dynamic measurement output feedback approach. In *American Control Conference,* 2018.

[13] P. N. Shivakumar and K. H. Chew. A sufficient condition for nonvanishing of determinants. *Proceedings of the American Mathematical Society,* 43(1):63-66, 1974.

[14] Y. Su and J. Huang. Cooperative output regulation of linear multi-agent systems. *IEEE Transactions on Automatic Control,* 57(4):1062-1066, 2012.

[15] Y. Su and J. Huang. Cooperative output regulation of linear multiagent systems by output feedback. *Systems & Control Letters,* 61(12):1248-1253, 2012.

[16] F. Adib Yaghmaie, F. L. Lewis, and R. Su. Output regulation of linear heterogeneous multi-agent systems via output and state feedback. *Automatica,* 67:157-164, 2016.

[17] M. Vidyasagar. *Input-output analysis of large-scale interconnected systems: Decomposition, well-posedness, and stability.* Springer-Verlag, 1981.

[18] X. Wang, Y. Hong, J. Huang, and Z.-P. Jiang. A distributed control approach to a robust output regulation problem for multiagent linear systems. *IEEE Transactions on Automatic Control,* 55(12):2891-2895, 2010.

[19] K. Zhou, J. C. Doyle, and K. Glover. *Robust and optimal control*. Prentice Hall, 1996.

Third Embodiment

FIG. 1 is a representation of a multiagent system having six agents of a distributed control architecture for spatial control of the multiagent system. Referring to FIG. 1, a multiagent system 100 comprises a group of six agents including a capable agent 110 and five other agents 120.

In one embodiment, the capable agent 110 and the other agents 120 represent six respective vehicles comprising a capable vehicle 110 and other vehicles 120 in a group of vehicles of the multiagent system 100. Arrows between the vehicles represent an example of peer-to-peer communication paths for exchanging navigation information among the six vehicles of the multiagent system 100. The dynamics of each of the agents is represented, for example, by linearized equations of translation dynamics described in the first and second embodiments.

Figure 6:
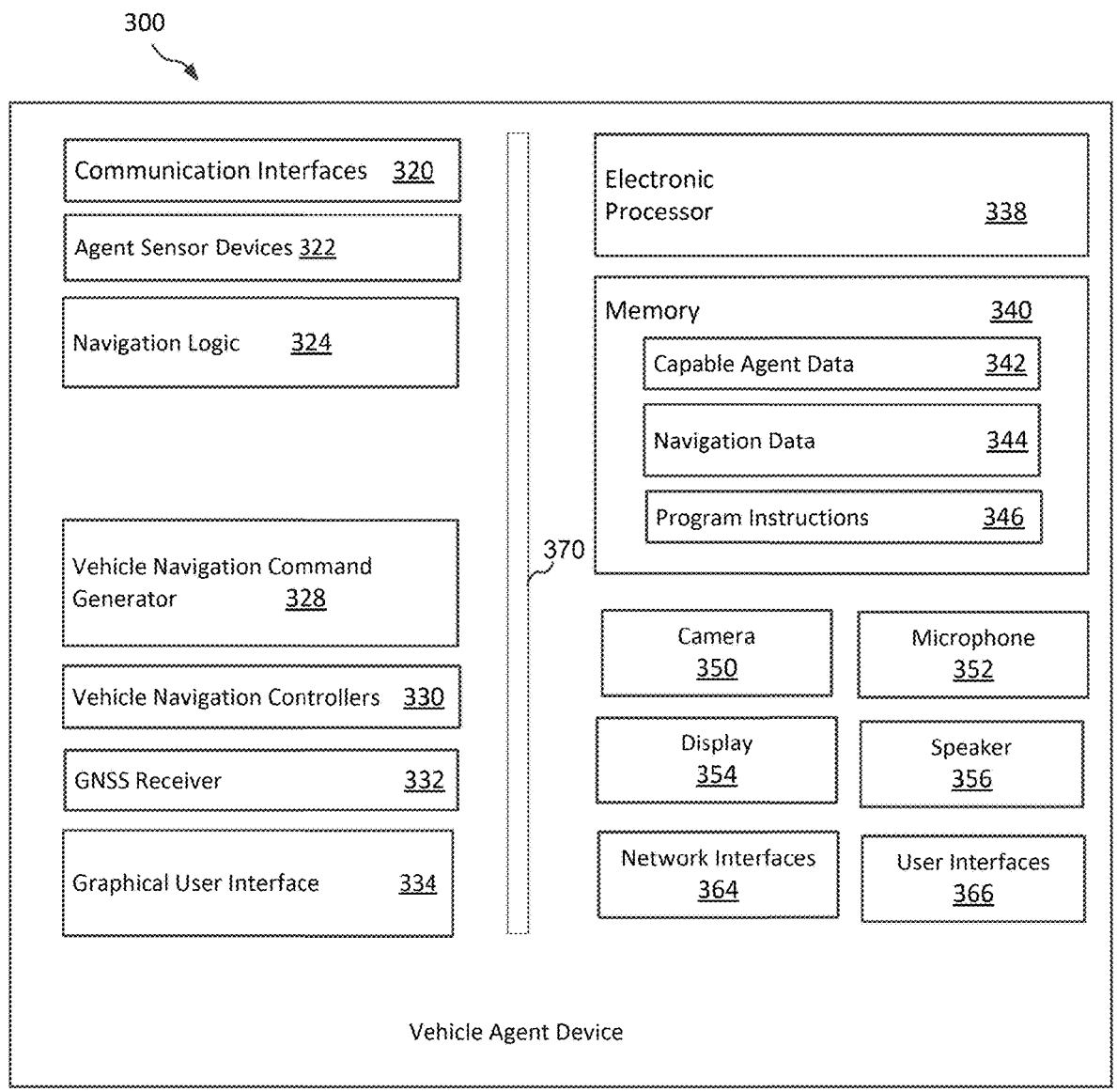
FIG. 6 is a block diagram of a vehicle agent device, in accordance with some embodiments.

FIG. 6 is a block diagram of a vehicle agent device 300. Referring to FIG. 6, there is shown a vehicle agent device 300 that includes, among other things, communication interfaces 320, agent sensor devices 322, navigation logic 324, a vehicle navigation command generator 328, vehicle navigation controllers 330, a GNSS receiver 332, a graphical user interface 334, an electronic processor 338, a memory 340, a camera 350, a microphone 352, a display 354, a speaker 356, a network interface 364, user interfaces 366 and an input/output (I/O) interface 370.

The vehicle agent device 300 may be similar or substantially the same as a capable agent 110 or one of the other agents 120 in the multiagent system having a distributed control architecture, as described with respect to FIG. 1. Other agent devices 120 of a group may be referred to as following agent devices 120. The vehicle agent device 300 may comprise a single device or may comprise a plurality of devices connected to or integrated within a vehicle platform. The vehicle platform may comprise any suitable autonomous underwater, ground, aerial, or space vehicle that is operable to travel as a member of a group having distributed control architecture as described herein. A vehicle platform may be configured to transport passengers or may be an unmanned vehicle platform. The vehicle platform may be controlled by the vehicle agent device 300 to travel as a member of a group or swarm of vehicles that communicate group course direction information via peer-to-peer communications among a plurality of vehicles that travel as members of the group.

A group of the vehicles may be referred to as a swarm and may comprise a plurality of vehicles that travel over time in a one dimensional spatial system, a two dimensional spatial system, or a three dimensional spatial system to reach a common destination. The common destination may be a fixed destination or one that changes position over time. For example, a group may pursue or follow a target vehicle or an object. The direction of travel of the group may change over time. The direction of travel of the group may be initiated by a vehicle agent device 300 that functions as a capable agent 110. The direction of travel of the group may further be implemented autonomously by one or more vehicle agent devices that function as other agents 120 of the group.

In one embodiment, a vehicle platform may comprise an automobile that travels over land or roads to pursue a moving target vehicle. In another embodiment, the vehicle platform may comprise flying crafts such as planes or drones that travel in the air or space towards a moving target. In another embodiment, the vehicle platform may comprise boats or submarines that travel in or under water. The moving target may travel in the air, space, water, or along the ground. In another embodiment, a plurality of vehicles of a group may travel towards a fixed destination. For example, vehicles traveling in a group may carry passengers, goods, or materials to a common fixed destination. However, the disclosure is not limited to any specific type of vehicle platform or mode of travel, and any suitable vehicle platform or mode of travel may be controlled by the vehicle agent device 300 to be a member of a group of vehicles.

Figure 3:
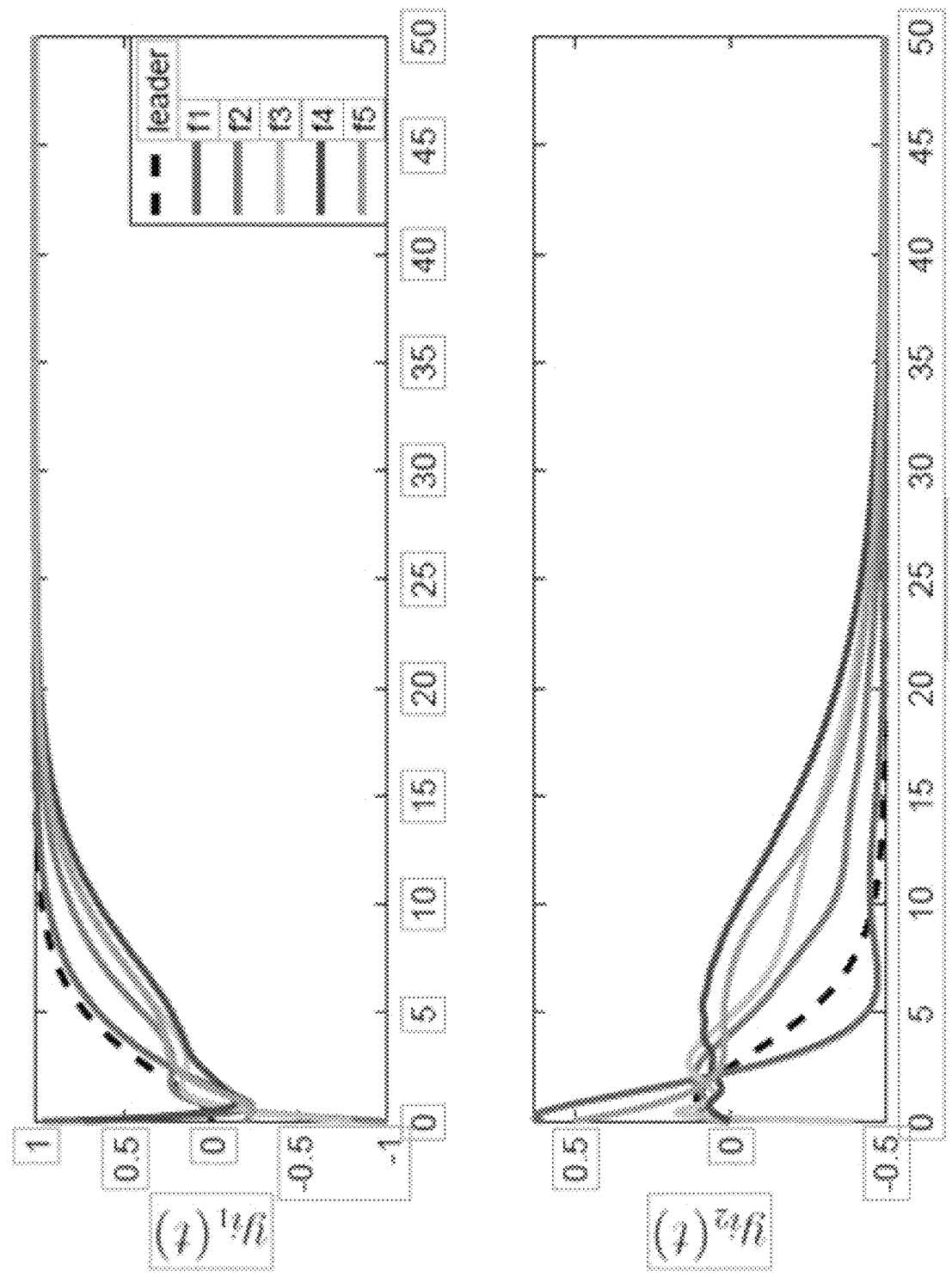
FIG. 3 are graphs that represent example output responses of a multi-agent system with a leader having linear dynamics, in accordance with the first embodiment.

The vehicle agent device 300 shown in FIG. 3 includes elements that enable the vehicle agent device 300 to function as a capable agent device 110 and as another agent device 120. The one or more other agent devices 120 of a group may be referred to as following agent devices 120. A group may comprise one or more capable agent devices 110 and one or more following agent devices 120. For example, a group may have one capable agent device 110 and one hundred following agent devices 120, or two capable agent devices and five hundred following agent devices 120 may comprise a group. However, the disclosure is not limited to a specific number of, or ratio of, capable agent devices 110 and following agent devices 120. Furthermore, although the vehicle agent device 300 shown in FIG. 3 includes elements that enable the vehicle agent device 300 to function as a capable agent device 110 and as another agent device 120, in some embodiments, the vehicle agent device 300 may include only features needed for functioning as a following agent 120. Alternatively the vehicle agent device 300 may include only features needed for functioning as a capable agent 120.

A vehicle agent device 300 that operates as a capable agent 110 may be referred to as a capable agent device. A vehicle agent device 300 that operates as one of the other agents 120 may be referred to as a following agent device. A vehicle agent device 300 may refer to either or both of a capable agent device or a following agent device.

The navigation logic 324 may determine a direction for a course of travel in one, two, or three dimensions for a vehicle platform connected to the vehicle agent device 300. For example, the navigation logic 324 may determine when, where, and how a connected vehicle platform should change its spatial orientation and to what degree its spatial orientation should change in its course of travel within a group. In one embodiment, the navigation logic 324 may utilize location information from the GNSS receiver 332 and may utilize navigation mapping software and USGS data, for example, to determine the course of travel. The navigation mapping software may track the location of the vehicle agent device 300 based on the GNSS location information. In some embodiments, the navigation logic 324 may utilize information received via one or more of the agent sensor devices 322 to determine the course of travel. For example, the agent sensor devices 322 may include ultrasonic sensors, infrared (IR) sensors, cameras with vision processing, a light detection and ranging system (LIDAR), peer-to-peer wireless radio communication, a sound navigation and ranging (SONAR) system, and the like. For example, the information from the agent sensor devices 322 may provide the location or relative location of one or more other vehicles or objects that the vehicle agent device 300 and its connected platform vehicle are following. The one or more other vehicles or objects may be a target of interest, such as a vehicle or object that the group as a whole is following or following. Moreover, the one or more other vehicles or objects sensed by the agent sensor devices 322 may include one or more other vehicles of a group that the vehicle agent device 300 is a member of and travelling among. This form of sensing of the other vehicles of the group may be referred to peer-to-peer communication among vehicles of the group, and may enable a plurality of vehicle agent devices 300 of the group to each autonomously determine their own direction of travel and/or speed.

A capable agent device may serve as a leader of a group of vehicles, and may receive or determine its own navigation parameters, for example, for direction of travel and speed, in a variety of ways. In one embodiment, when the vehicle agent device 300 functions as a capable agent device, the navigation logic 324 may determine a course direction for the capable agent device based on instructions received via a wireless interface of the communication interfaces 320, from an external control station 360 (see FIG. 1). In this regard, the external control station 360 may be external to the group of vehicles such that the vehicle agent device 300 is a member of, and may be a stationary external control station or a moving external control station. Furthermore, communications between the capable agent device and the external control station 360 are external to the peer-to-peer communications that occur among the members of the group that the capable agent device is a member of.

A capable agent device may communicate with the external control station 360 based on any suitable wireless technology or protocols. For example, the external communications may be transmitted via wireless wide area, local area, or personal area networks. Furthermore, the external communications may be implemented using, without limitation, cellular, satellite, Wi-Fi, Bluetooth, two-way radio, half duplex radio, and military or public safety communication systems. The external control station 360 may communicate direction information only with capable agent devices, and may not provide direction information to any of the following agent devices. Furthermore, the external control station 360 and the capable agent device may not have a global knowledge of the state of the group that the vehicle agent device 300 is a member of and travelling among. For example, the location and/or direction of travel of all of the following agent devices may not be known to, and are not communicated by the external control station 360, the capable agent device, or the following agent devices. Instead, the direction of travel of following agent devices travelling among a group, depend on one or more of peer-to-peer communication, local measurements, and autonomous navigation determination. In other words, the external control station 360 may provide navigation control information only to the capable agent device.

In some embodiments, the vehicle platform connected to a capable agent device may be a piloted vehicle. The pilot of the vehicle platform may provide navigation control input to the capable agent device via the graphical user interface 334 or by piloting the vehicle platform of the capable agent device. The pilot input may be received in addition to, or in place of, the information received from the external control station 360. The pilot's and/or external control station 360 control input may communicated peer-to-peer to one or more following agent devices, and may be further propagated peer-to-peer throughout the group.

In some embodiments, the navigation logic 324 may determine navigation parameters for group vehicle navigation commands based on input from one or more agent sensor devices 322 and location information received from the GNSS receiver 332 (for example, data received from vehicle sensors). For example, the navigation and parameters may be based on sensor information received while the vehicle platform and the vehicle agent device 300 are trained on the target of interest and encounter objects or obstacles along a course traveled while tracking the target of interest. Alternatively, the navigation parameters for group vehicle navigation commands may be based on program instructions stored in the memory 340 and/or data from the agent sensor devices 322 received while the capable agent travels along a programmed course.

In some embodiments, there may be more than one capable agent device that functions to lead a group of following vehicles. The multiple capable agent devices may not communicate with each other. However, if the multiple capable agent devices propagate different peer-to-peer commands to the following agent devices of the group, for example, for different navigation scaling factors, the scale factors may eventually reach a consensus value in the group, for example, an average of the different scale factors.

The vehicle navigation command generator 328 may generate commands to the vehicle platform connected to the vehicle agent device 300. The commands may be generated utilizing information received from the group navigation logic. The commands may control the direction of travel of the vehicle platform and the distance of the vehicle platform from any other vehicle agent vehicle platforms that are travelling as a member of the same group. The speed of following agent devices of a group may depend directly or indirectly on the speed of the capable agent device of the group. The speed of the capable agent device may be controlled by the external control station 360, a pilot, or the speed of an object or vehicle that the capable agent device is following.

The vehicle navigation command generator 328 may generate navigation commands for peer-to-peer communication to one or more neighboring following agent devices. The navigation commands for neighboring following agent devices are communicated between agents and may include an agent's current position, scaling factor, rotation angle (to control the group's orientation), and a local integral state vector (to construct the local control).

The vehicle navigation controllers 330 may comprise one or more control interfaces to, for example, steering, elevation, speed, or braking systems in the vehicle platform that the vehicle agent device 300 is connected to. The vehicle navigation controllers 330 may communicate the generate group vehicle navigation commands to the steering, elevation, speed, or braking systems in order for the vehicle platform to perform as a member of the group and perform group tasks. In some embodiments, the vehicle navigation controller 330 controls the movement of the vehicle agent device 300 based on the self-navigation input control signal described herein.

In some embodiments, the electronic processor 338 may be communicatively coupled to, the I/O interface 370, one or more the communication interfaces 320, the agent sensor devices 322, the navigation logic 324, the vehicle navigation command generator 328, the vehicle navigation controllers 330, the GNSS receiver 332, the graphical user interface 334, the electronic processor 338, the memory 340, the camera 350, the microphone 352, the display 354, the speaker 356, the network interface 364 and the user interfaces 366.

The memory 340 may store program instructions 346 that when executed by the electronic processor 338 may cause the electronic processor 338 to perform or support functions of the vehicle agent device 300 according to the embodiments.

In various embodiments, electronic processor 338 may be a uniprocessor system including one electronic processor 338, or a multiprocessor system including several electronic processors 338 (for example, two, four, eight, or another suitable number). Electronic processors 338 may be any suitable processor capable of executing instructions. For example, in various embodiments, the electronic processors 338 may implement any of a variety of instruction set architectures (ISAs), such as the x86, PowerPC, SPARC, or MIPS ISAs, or any other suitable ISA. In multiprocessor systems, each of the electronic processors 338 may commonly, but not necessarily, implement the same ISA.

In some embodiments, at least one electronic processor 338 may be a graphics processing unit. A graphics processing unit or GPU may be considered a dedicated graphics-rendering device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

The memory 340 may be configured to store program instructions 346 and/or program data (for example, capable agent data 342 and navigation data 344) accessible by the electronic processor 338 and/or by the navigation logic, 324, the vehicle navigation command generator 328, and/or the vehicle navigation controllers 330, among other elements of the vehicle agent device 300. In various embodiments, the memory 340 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments, are shown stored within the memory 340 as program instructions 346 and data storage 342 and 344. In other embodiments, program instructions and/or data may be received, sent or stored upon different types of computer-accessible media or on similar media separate from the memory 340 or vehicle agent device 300. Moreover, in some embodiments, a database that is accessible via the network interface 364 may store, among other things, data for implementing desired functions, such as those described above for various embodiments. Generally speaking, a computer-accessible medium may include storage media or memory media such as magnetic or optical media, for example, disk or CD/DVD-ROM coupled to the vehicle agent device 300 via the I/O interface 370. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 364.

In one embodiment, I/O interface 370 may be configured to coordinate I/O traffic between electronic processor 338, memory 340, one or more of the communication interfaces 320, the agent sensor devices 322, the navigation logic 324, the vehicle navigation command generator 328, the vehicle navigation controllers 330, the GNSS receiver 332, the graphical user interface 334, and any peripheral devices in the vehicle agent device 300, including network interface 364 or other peripheral interfaces, such as the camera 350, microphone 352, display 345, speaker 356, and user interfaces 366. In some embodiments, I/O interface 370 may perform any necessary protocol, timing or other data transformations to convert data signals from one component (for example, the memory 340) into a format suitable for use by another component (for example, electronic processor 338). In some embodiments, I/O interface 370 may include support for devices attached through various types of peripheral buses, such as a variant of the Peripheral Component Interconnect (PCI) bus standard or the Universal Serial Bus (USB) standard, for example. In some embodiments, the function of I/O interface 370 may be split into two or more separate components, such as a north bridge and a south bridge, for example. In addition, in some embodiments some or all of the functionality of I/O interface 370, such as an interface to memory 340, may be incorporated directly into electronic processor 338.

The network interface 364 may be configured to allow data to be exchanged between the vehicle agent device 300 and other devices attached to a network, such as computer systems, a database, or between nodes of the vehicle agent device 300. In various embodiments, network interface 364 may support communication via wired or wireless general data networks, for example: via telecommunications/telephony networks such as voice networks or digital fiber communications networks; via storage area networks such as Fiber Channel SANs, or via any other suitable type of network and/or communications protocol.

The user interfaces may support, in some embodiments, one or more of display terminals, keyboards, keypads, touchpads, scanning devices, voice or optical recognition devices, or any other devices suitable for entering or retrieving data by one or more vehicle agent device 300. Multiple user input/output devices may be present in the vehicle agent device 300 or may be distributed on various nodes of the vehicle agent device 300. In some embodiments, similar input/output devices may be separate from the vehicle agent device 300 and may interact with one or more nodes of the vehicle agent device 300 through a wired or wireless connection, such as over network interface 364.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated vehicle agent device 300 via inter-device communication. Some or all of the system components or data structures may also be stored (for example, as instructions or structured data) on a computer-accessible medium or a portable article to be read by an appropriate drive, various examples of which are described above. In some embodiments, instructions stored on a computer-accessible medium separate from the vehicle agent device 300 may be transmitted to the vehicle agent device 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other system configurations.

Figure 7:
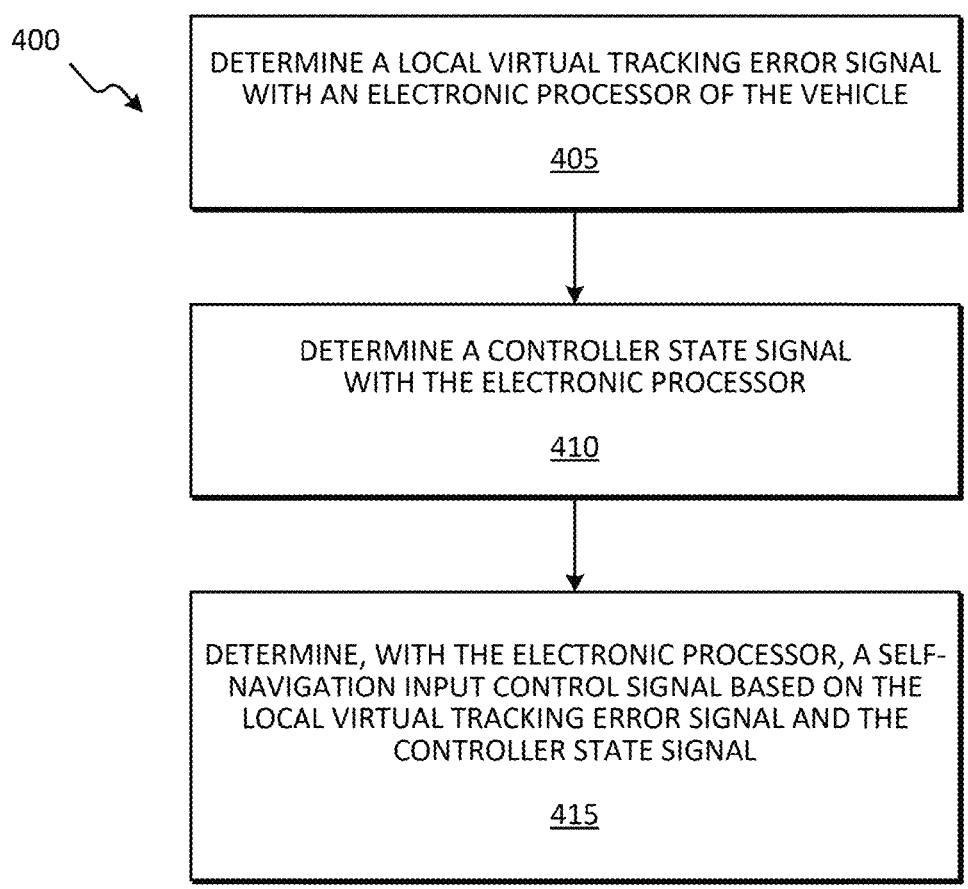
FIG. 7 is a flow chart of a method for controlling motion of a vehicle in a group of vehicles, in accordance with some embodiments.

FIG. 7 is a flow chart of a method 400 for controlling motion of a vehicle in a group of vehicles. At block 405, the electronic processor 338 of the vehicle (for example, the vehicle agent device 300) determines a local virtual tracking error signal. For example, the electronic processor 338 may determine the local virtual tracking error signal in accordance with equation (205) described in the second embodiment.

At block 410, the electronic processor 338 of the vehicle determines a controller state signal. For example, the electronic processor 338 may determine the controller state signal in accordance with the controller state $z_i(t)$ described in the second embodiment.

At block 415, the electronic processor 338 of the vehicle determines self-navigation input control signal based on the local virtual tracking error signal and the controller state signal. For example, the electronic processor 338 may determine the self-navigation input control signal (for example, $u_i(t)$) in accordance with equation (206), equation (208), and/or equation (211) described in the second embodiment.

In some embodiments, the electronic processor 338 receives data from a plurality of vehicle sensors (for example, the agent sensor devices 322). In some embodiments, the electronic processor 338 determines a local measurement output signal (for example, $y_{mi}(t)$) based on the data received from the plurality of vehicle sensors. For example, the electronic processor 338 may determine the local measurement output signal based on equation (208) described in the second embodiment. In some embodiments, the electronic processor 338 determines the self-navigation input control signal based on the local measurement output signal. For example, the electronic processor 338 may determine the self-navigation input control signal based on equations (208) and (209) described in the second embodiment.

In some embodiments, the electronic processor 338 determines the location virtual tracking error signal based on a tracking error signal, a relative output error signal, or both. In some embodiments, the electronic processor 338 receives the tracking error signal (for example, $e_i(t)$) from a capable agent vehicle. In some embodiments, the electronic processor 338 receives the relative output error signal (for example, $y_i(t)-y_j(t)$) from a neighboring agent vehicle. In some embodiments, the electronic processor 338 receives data from a neighboring vehicle (for example a position or a heading) and determine the relative output error signal (for example, $y_i(t)-y_j(t)$) based at least in part on the data received from the neighboring agent vehicle.

In some embodiments, the electronic processor 338 receives determines a self-state signal (for example, $x_i(t)$) based on equations (206) and (207) described in the second embodiment.

In this disclosure, the cooperative output regulation problem of heterogeneous linear time-invariant multiagent systems over fixed directed communication graph topologies is described. Among other things, this disclosure provides a new definition of the linear cooperative output regulation problem (see Definition 2), which allows a broad class of functions to be tracked and rejected by a network of agents, and focused on an internal model based distributed control approach. For the three different distributed control laws (i.e., dynamic state feedback, dynamic output feedback with local measurement, and dynamic output feedback), global and local sufficient conditions are determined (see Theorems 1B, 2B, 3B, 4B, and 5B).

The approach in this disclosure is relevant, for example, to the linear cooperative output regulation problem with an internal model based distributed dynamic state feedback control law. This disclosure considers not only dynamic state feedback but also dynamic output feedback with local measurement and dynamic output feedback, where the output feedback stabilizability is not assumed. To prove the existence of a unique solution to the matrix equations that is important for the solvability of the problem, previously systems decompose these matrix equations, which consist of the overall dynamics of the multiagent system, into matrix equations, which deal with the dynamics of each agent separately. In contrast, Lemma 3B as described herein, which is also applicable to dynamic output feedback cases, guarantees that these matrix equations have a unique solution without the need to decompose them.

Various features and advantages are set forth in the following claims.

What is claimed is:

1. A system for controlling motion of a vehicle in a group of vehicles, the system comprising
 a communication interface;
 a vehicle platform for travelling among the group of vehicles; and
 an electronic processor configured to
  determine a local virtual tracking error signal,
  determine a controller state signal, and
  determine a self-navigation input control signal based on the local virtual tracking error signal and the controller state signal,
  wherein the self-navigation input control signal is for navigating the vehicle platform when travelling as a member of the group of vehicles, wherein a trajectory of an exosystem is based on a boundedness condition, wherein the trajectory of the exosystem including external disturbances and a trajectory of a leader vehicle of the group of vehicles, wherein the vehicle communicates with other vehicles in the group of vehicles via a fixed augmented directed connected communication graph topology, wherein each vehicle in the group of vehicles is stabilizable, wherein each vehicle in the group of vehicles satisfies a transmission zero condition, wherein design matrices of the vehicle satisfy an internal model principle,
  wherein the self-navigation input control signal, $u_i(t)$, is defined by:

$u_i(t)=\overline{K}_i z_i(t)$, wherein $\overline{K}_i$ is a controller gain and $z_i(t)$, is the controller state signal at time, t, and wherein the controller state signal, $z_i(t)$, is defined by at least one of:

$\dot{z}_i(t)=M_{1i}z_i(t)+M_{2i}e_{vi}(t)$ wherein $M_{1i}$ and $M_{2i}$ are design matrices and $e_{vi}(t)$ is the local virtual tracking error signal at the time, t,
   wherein the controller gain, $K_i$, is selected such that an agent-wise local gain condition is less than one, and wherein a locally-controlled agent matrix of the vehicle is Hurwitz, or $\dot{z}_i(t)=M_{1i}z_i(t)+M_{2i}e_{vi}(t)+M_{3i}y_{mi}(t)$, wherein $M_{1i}$, $M_{2i}$, and $M_{3i}$ are design matrices, $e_{vi}(t)$ is the local virtual tracking error signal at the time, t, and $y_{mi}(t)$ is a local measurement output signal at the time, t, wherein the controller gain, $\overline{K}_i$, is selected such that an agent-wise local gain condition is less than one, wherein a locally-controlled agent matrix of the vehicle is Hurwitz, and wherein an observer gain, $H_i$, is selected such that the locally-observed agent matrix on the vehicle is Hurwitz.

2. The system of claim 1, wherein each vehicle of the group of vehicles is detectable based on an output matrix.

3. The system of claim 1, wherein the controller state signal, $z_i(t)$, is defined by $$\dot{\overline{z}}_i(t) = M_{1i}\overline{z}_i(t) + M_{2i}e_{vi}(t) + M^{3i}y_{mi}$$

wherein each vehicle of the group of vehicles is detectable based on a measurement output matrix, wherein the system further comprising a plurality of vehicle sensors, and wherein the electronic processor is further configured to
 determine the local measurement output signal based on data received from the plurality of vehicle sensors, and
 determine the self-navigation input control signal based on the local measurement output signal.

4. A method for controlling motion of a vehicle in a group of vehicles, the method comprising
 determining, with an electronic processor of the vehicle, a local virtual tracking error signal;
 determining, with the electronic processor, a controller state signal; and
 determining, with the electronic processor, a self-navigation input control signal based on the local virtual tracking error signal and the controller state signal,
 wherein the self-navigation input control signal is for navigating a vehicle platform of the vehicle when travelling as a member of the group of vehicles, wherein a trajectory of an exosystem is based on a boundedness condition, wherein the trajectory of the exosystem including external disturbances and a trajectory of a leader vehicle of the group of vehicles, wherein the vehicle communicates with other vehicles in the group of vehicles via a fixed augmented directed connected communication graph topology, wherein each vehicle in the group of vehicles is stabilizable, wherein each vehicle in the group of vehicles satisfies a transmission zero condition, wherein design matrices of the vehicle satisfy an internal model principle,
 wherein the self-navigation input control signal, $u_i(t)$, is defined by:

$$u_i(t) = \overline{K}_i\overline{z}_i(t),$$

wherein $\overline{K}_i$ is a controller gain and $z_i(t)$ is the controller state signal at time, t, and wherein the controller state signal, $z_i(t)$, is defined by at least one of:

$$\dot{\overline{z}}_i(t) = M_{1i}\overline{z}_i(t) + M_{2i}e_{vi}(t)$$

wherein $M_{1i}$ and $M_{2i}$ are design matrices and $e_{vi}(t)$ is the local virtual tracking error signal at the time, t,
wherein the controller gain, $\overline{K}_i$, is selected such that an agent-wise local gain condition is less than one, and wherein a locally-controlled agent matrix of the vehicle is Hurwitz, or $$\dot{\overline{z}}_i(t) = M_{1i}\overline{z}_i(t) + M_{2i}e_{vi}(t) + M_{3i}y_{mi}(t),$$

wherein $M_{1i}$, $M_{2i}$, and $M_{3i}$ are design matrices, $e_{vi}(t)$ is the local virtual tracking error signal at the time, t, and $y_{mi}(t)$ is a local measurement output signal at the time, t, wherein the controller gain, $\overline{K}_i$, is selected such that an agent-wise local gain condition is less than one, wherein a locally-controlled agent matrix of the vehicle is Hurwitz, and wherein an observer gain, $H_i$, is selected such that the locally-observed agent matrix on the vehicle is Hurwitz.

5. The method of claim 4, wherein each vehicle of the group of vehicles is detectable based on an output matrix.

6. The method of claim 4, wherein the controller state signal, $z_i(t)$, is defined by $$\dot{\overline{z}}_i(t) = M_{1i}\overline{z}_i(t) + M_{2i}e_{vi}(t) + M_{3i}y_{mi}(t),$$

wherein each vehicle of the group of vehicles is detectable based on a measurement output matrix, and wherein the method further comprising
 receiving, at the electronic processor, data from a plurality of vehicle sensors of the vehicle;
 determining, with the electronic processor, the local measurement output signal based on the data received from the plurality of vehicle sensors; and
 determining, with the electronic processor, the self-navigation input control signal based on the local measurement output signal.

7. The method of claim 4, further comprising
 determining, with the electronic processor, a self-state signal; and
 determining, with the electronic processor, the self-navigation input control signal based on the self-state signal.

8. A system for controlling motion of a vehicle in a group of vehicles, the system comprising
 a communication interface;
 a vehicle platform for travelling among the group of vehicles; and
 an electronic processor configured to
  determine a local virtual tracking error signal,
  determine a controller state signal,
  determine a self-state signal, and
  determine a self-navigation input control signal based on the local virtual tracking error signal, the controller state signal, and the self-state signal,
 wherein the self-navigation input control signal is for navigating the vehicle platform when travelling as a member of the group of vehicles, wherein a trajectory of an exosystem is based on a boundedness condition, wherein the trajectory of the exosystem including external disturbances and a trajectory of a leader vehicle of the group of vehicles, wherein the vehicle communicates with other vehicles in the group of vehicles via a fixed augmented directed connected communication graph topology, wherein each vehicle in the group of vehicles is stabilizable, wherein each vehicle in the group of vehicles satisfies a transmission zero condition, wherein design matrices of the vehicle satisfy an internal model principle,
 wherein the self-navigation input control signal, $u_1(t)$, is defined by:

$$u_i(t) = K_{1i}x_i(t) + K_{2i}\overline{z}_i(t),$$

wherein $K_{1i}$ and $K_{2i}$ are controller gains, $x_i(t)$ is the self-state signal at time, t, and $z_i(t)$ is the controller state signal at the time, t, wherein the controller state signal, $z_i(t)$, is defined by:

$$\dot{\overline{z}}_i(t) = G_{1i}\overline{z}_i(t) + G_{2i}e_{vi}(t)$$

wherein $G_{1i}$ and $G_{2i}$ are design matrices, and $e_{vi}(t)$ is the local virtual tracking error signal at the time, t.

9. The system of claim 8, wherein the vehicle platform comprises an underwater, ground, aerial, or space vehicle.

10. The system of claim 8, wherein the group of vehicles travel over time in a one-dimensional spatial system, a two-dimensional spatial system, or a three-dimensional spatial system.

11. The system of claim 8, wherein the internal model principle comprises an N p-copy internal model principle.

12. The system of claim 8, wherein the group of vehicles travel over time to reach a common destination.

13. The system of claim 12, wherein the common destination comprises a fixed destination or a destination that changes over time.

\* \* \* \* \*